US006883346B2

(12) United States Patent
Tanimoto et al.

(10) Patent No.: US 6,883,346 B2
(45) Date of Patent: Apr. 26, 2005

(54) FREEZER

(75) Inventors: Kenji Tanimoto, Osaka (JP); Takeo Ueno, Osaka (JP); Masaaki Takegami, Osaka (JP); Satoru Sakae, Osaka (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 10/470,016

(22) PCT Filed: Oct. 23, 2002

(86) PCT No.: PCT/JP02/11019

§ 371 (c)(1),
(2), (4) Date: Jul. 23, 2003

(87) PCT Pub. No.: WO03/036189

PCT Pub. Date: May 1, 2003

(65) Prior Publication Data

US 2004/0093893 A1 May 20, 2004

(30) Foreign Application Priority Data

Oct. 23, 2001 (JP) .......................................... 2001-324851
Jan. 9, 2002 (JP) .......................................... 2002-002390

(51) Int. Cl.[7] ................................................. F25B 1/10
(52) U.S. Cl. ............................................ 62/510; 62/498
(58) Field of Search .............................. 62/228.5, 498, 62/510, 515

(56) References Cited

U.S. PATENT DOCUMENTS 6,393,858 B1 * 5/2002 Mezaki et al. ................ 62/335

2003/0010047 A1 * 1/2003 Shimoda ..................... 62/228.3

FOREIGN PATENT DOCUMENTS

| JP | 60-259867 A | 12/1985 |
|---|---|---|
| JP | 62-21888 Y2 | 6/1987 |
| JP | 1-262387 A | 10/1989 |
| JP | 5-231758 A | 9/1993 |
| JP | 6-257889 A | 9/1994 |
| JP | 8-86528 A | 4/1996 |
| JP | 11-83217 A | 3/1999 |
| JP | 2001132642 A * | 5/2001 |
| JP | 2001-233329 A | 8/2001 |
| JP | 2001-241789 A | 9/2001 |
| JP | 2001-280729 A | 10/2001 |
| WO | WO 98/45651 A1 | 10/1998 |

* cited by examiner

Primary Examiner—Melvin Jones
(74) Attorney, Agent, or Firm—Birch, Stewart, Kolasch & Birch, LLP.

(57) ABSTRACT

In a refrigerating apparatus (1) having application-side heat exchangers (41, 45, 51) for a plurality of systems for air-conditioning, for cold-storage/freezing and the like and a four-way switch valve (3C) and a plurality of check valves (7) on suction sides of compression mechanisms (2D, 2E) and formed from three compressors (2A, 2B, 2C) to allow the operation states to be switched, the number of compressors (2A, 2B, 2C) used at air-conditioning side and cold-storage/freezing side is limited to two at maximum, thereby achieving a simple circuit configuration in which the number of the check valves (7) to be provided in the suction sides of the compression mechanisms (2D, 2E) is reduced to one or two, suppressing the occurrence of chattering noise in check valves (7) and, also, preventing an ability from reducing due to a suction-side pressure loss.

8 Claims, 17 Drawing Sheets

FREEZER

This application is the national phase under 35 U.S.C. § 371 of PCT International Application No. PCT/JP02/11019 which has an International filing date of Oct. 23, 2002, which designated the United States of America.

TECHNICAL FIELD

The present invention relates to a refrigerating apparatus and, more particularly, to a refrigerating apparatus having a compression mechanism formed by combining three compressors.

BACKGROUND ART

Conventionally, there has been known a refrigerating apparatus performing a refrigerating cycle, and the refrigerating apparatus has been widely used as a cooling machine for an air-conditioner which heats/cools indoor air, a food-stocking refrigerator, a freezer and a showcase. The refrigerating apparatus includes that of a type, as disclosed in WO98/45651, that performs both air-conditioning and cold-storage/freezing. The refrigerating apparatus of this type comprises a plurality of application-side heat exchangers such as an air-conditioning heat exchanger, a cold-storage heat exchanger and a freezing heat exchanger, and is installed in, for example, convenience stores.

The refrigerating apparatus of this type sometimes uses a plurality of combined compressors in order to widely vary the capacity of the compressor depending on the operation condition of the plurality of application-side heat exchangers. For example, the present applicant has been proposed an apparatus wherein three compressors including a compressor having variable capacity are combined to form a compression mechanism and, also, a four-way switch is provided on a suction side of the compression mechanism, so that the four-way selector valve is on/off controlled to switch the communication of four ports to allow the three compressors to be appropriately selectable for use for the air-conditioning side and cold-storage/freezing side (for example, Japanese Unexamined Patent Application No. 2001-233329). More specifically, in the apparatus, in addition to the four-way selector valve, four check valves are combined and used on the suction side of the compression mechanism, whereby the three compressors are operable in various combined patterns. For example, the all the three compressors can be used for the cold-storage/freezing side or, alternatively, the three compressors can be separated into two and one for use for the cold-storage/freezing side and the air-conditioning side, respectively.

-Problems to be Solved-

However, since the four-way switch valve and the four check valves are provided in a suction pipe, connection arrangements thereof are complex. In addition, when the cold-storage/freezing side or the air-conditioning side becomes deficient in ability, on/off control of the four-way switch valve is performed to switch the operation state of the compression mechanism. As a result, it is considered that the flow direction of refrigerant is reversed in each of the check valves on every switching, thereby causing noise (chattering noise).

Further, in the apparatus described above, the number of the check valves is as large as four. As such, when, for example, all the three compressors are used for the cold-storage/freezing side, the piping resistance of the suction pipe tends to increase to be relatively high. This can cause a pressure loss in the suction side, reducing the ability of the refrigerating apparatus.

The present invention has been devised in view of the above problems, and an object thereof is to provide a refrigerating apparatus wherein a switch valve, such as a four-way switch valve, and check valves are provided on the suction side of a compression mechanism formed from three compressors so as to switch operation states, thereby suppressing the generation of chattering noise in check valves and also preventing an ability from reducing due to a suction-side pressure loss.

DISCLOSURE OF THE INVENTION

The present invention has a feature in that the number of compressors (2A, 2B, 2C) used at air-conditioning side and cold-storage/freezing side is limited to two at maximum, respectively, thereby achieving a simple circuit configuration in which the number of the check valves (7) to be provided together with a switch valve in the suction sides of compression mechanisms (2D, 2E) is reduced to two, and suppressing the occurrence of chattering noise and capacity reduction.

Specifically, first solving means according to the present invention is premised on a refrigerating apparatus wherein compression mechanisms (2D, 2E) of a refrigerant circuit (1E) having application-side heat exchangers (41, 45, 51) of a plurality of systems are formed by combining three compressors (2A, 2B, 2C), a four-way switch valve (3C) is connected to the suction sides of the compression mechanisms (2D, 2E), and the four-way switch valve (3C) can switch between a first state where a first port (P1) is communicated with a second port (P2) and a third port (P3) is communicated with a fourth port (P4) and a second state where the first port (P1) is communicated with the fourth port (P4) and the second port (P2) is communicated with the third port (P3).

As shown in FIG. 1, the refrigerating apparatus is characterized in that a branch pipe (6d) of a suction pipe (6a) of the first compressor (2A) is connected to the first port (P1) of the four-way switch vale (3C) through a check valve (7) for permitting the flow of a refrigerant directed to the first port (P1); a suction pipe (6b) of the second compressor (2B) is connected to the second port (P2); a branch pipe (6e) of a suction pipe (6c) of the third compressor (2C) is connected to the third port (P3) through the check valve (7) for permitting the flow of a refrigerant directed to the third port (P3); and a high-pressure side pipe (28a) of the refrigerant circuit (1E) is connected to the fourth port (P4).

Second solving means according to the present invention is characterized in that, in the first solving means, the application-side heat exchangers (41, 45, 51) of the plurality of systems include application-side heat exchangers (45, 51) for cold-storage/freezing and an application-side heat exchanger (41) for air-conditioning.

In the first and second solving means, when the four-way switch valve (3C) switches a state into the first state where the first port (P1) is communicated with the second port (P2) and the third port (P3) is communicated with the fourth port (P4), a refrigerant returned to the suction pipe (6a) of the first compressor (2A) is sucked into the first compressor (2A) from the suction pipe (6a). Concurrently, the refrigerant is sucked into the second compressor (2B) from the branch pipe (6d) of the suction pipe (6a) through the four-way switch valve (3C) and the suction pipe (6b) of the second compressor (2B). When only one of the first compressor (2A) and second compressor (2B) is activated, the refrigerant is sucked only into the activated compressor, as a matter of course. The refrigerant returned to the suction pipe (6c) of the third compressor (2C) is sucked only into the third compressor (2C). This is because a high pressure of the refrigerant circuit (1E) is applied from the fourth port (P4) side of the four-way switch valve (3C) to the check valve (7) provided in the branch pipe (6e) of the suction pipe (6c) of the third compressor (2C). Consequently, in this state, cold-storage/freezing can be implemented using, for example, the first compressor (2A) and the second compressor (2B), and air-conditioning can be implemented using the third compressor (2C).

When the four-way switch valve (3C) switch a state into the second state where the first port (P1) is communicated with the fourth port (P4) and the second port (P2) is communicated with the third port (P3), the refrigerant returned to the suction pipe (6a) of the first compressor (2A) is sucked only into the first compressor (2A). This is because a high pressure of the refrigerant circuit (1E) is applied from the fourth port (P4) side of the four-way switch valve (3C) to the check valve (7) provided in the branch pipe (6d) of the suction pipe (6a) of the first compressor (2A). In addition, the refrigerant returned to the suction pipe (6c) of the third compressor (2C) is sucked into the third compressor (2C) from the suction pipe (6c). Concurrently, the refrigerant is sucked into the second compressor (2B) from the branch pipe (6e) of the suction pipe (6c) through the four-way switch valve (3C) and the suction pipe (6b) of the second compressor (2B). When only one of the second compressor (2B) and third compressor (2C) is activated, the refrigerant is sucked only into the activated compressor, as a matter of course. Consequently, in this state, cold-storage/freezing can be implemented using, for example, the first compressor (2A), and air-conditioning can be implemented using the second compressor (2B) and the third compressor (2C).

Third solving means according to the present invention is characterized in that, in the first or second solving means, each of the compressors (2A, 2B, 2C) forming the compression mechanism (2D, 2E) is formed from a compressor having a variable capacity.

According to the third solving means, each of the compressors (2A, 2B, 2C) is formed from a compressor having a variable capacity. As such, the capacity of each of the compressors (2A, 2B, 2C) can be discretely adjusted to meet a necessary refrigerating ability, and finely controlled operation can be implemented in each of the application-side heat exchangers (41, 45, 51) for the systems for cold-storage/freezing, air-conditioning and the like.

Fourth solving means according to the present invention is premised on a refrigerating apparatus wherein compression mechanisms (2D, 2E) of a refrigerant circuit (1E) having application-side heat exchangers (41, 45, 51) of a plurality of systems are formed by combining three compressors (2A, 2B, 2C).

As shown in FIG. 15, in the refrigerating apparatus, a branch pipe (6d) of a suction pipe (6a) of the first compressor (2A) is connected to a suction pipe (6b) of the second compressor (2B) through a check valve (7) for permitting the flow of a refrigerant directed to the second compressor (2B), and a branch pipe (6e) of a suction pipe (6c) of the third compressor (2C) is connected to a suction pipe (6b) of the second compressor (2B) through the check valve (7) for permitting the flow of a refrigerant directed to the second compressor (2B) and an open/close valve (7i) for opening/closing the branch pipe (6e). As the open/close valve (7i), for example, a solenoid valve is used.

In the fourth solving means, when the open/close valve (7i), which is provided in the branch pipe (6e) of the suction pipe (6c) of the third compressor (2C), is closed, the refrigerant returned to the suction pipe (6a) of the first compressor (2A) is sucked into the first compressor (2A) from the suction pipe (6a). Concurrently, the refrigerant is sucked into the second compressor (2B) from the branch pipe (6d) of the suction pipe (6a) through the suction pipe (6b) of the second compressor (2B). When only one of the first compressor (2A) and second compressor (2B) is activated, the refrigerant is sucked only into the activated compressor, as a matter of course. The refrigerant returned to the suction pipe (6c) of the third compressor (2C) is sucked only into the third compressor (2C). This is because the open/close valve (7i), which is provided in the branch pipe (6e) of the suction pipe (6c) of the third compressor (2C), is closed. Consequently, in this state, cold-storage/freezing can be implemented using, for example, the first compressor (2A) and the second compressor (2B), and air-conditioning can be implemented using the third compressor (2C).

When the open/close valve (7i) is opened, the refrigerant returned to the suction pipe (6a) of the first compressor (2A) is sucked into both the first compressor (2A) and the second compressor (2B). The refrigerant returned to the suction pipe (6c) of the third compressor (2C) is sucked into the third compressor (2C) and the second compressor (2B). Thus, refrigerant on the cold-storage/freezing side and refrigerant on the air-conditioning side, for example, are merged and returned to the second compressor (2B). Consequently, in this state, the second compressor (2B) can be used to boost air-conditioning, for example.

Fifth solving means according to the present invention is premised on a refrigerating apparatus wherein compression mechanisms (2D, 2E) of a refrigerant circuit (1E) having application-side heat exchangers (41, 45, 51) of a plurality of systems are formed by combining three compressors (2A, 2B, 2C).

As shown in FIG. 16, in the refrigerating apparatus, a branch pipe (6d) of a suction pipe (6a) of the first compressor (2A) is connected to a suction pipe (6b) of the second compressor (2B) through a check valve (7) for permitting the flow of a refrigerant directed to the second compressor (2B), and a branch pipe (6e) of a suction pipe (6c) of the third compressor (2C) is connected to the suction pipe (6b) of the second compressor (2B) through the check valve (7), for permitting the flow of the refrigerant directed to the second compressor (2B), and a four-way switch valve (3C). In the four-way switch valve (3C), a first port (P1) is closed, the suction pipe (6b) of the second compressor (2B) is connected to a second port (P2), the branch pipe (6e) of the suction pipe (6c) of the third compressor (2C) is connected to a third port (P3), and a high-pressure side pipe (28a) of the refrigerant circuit (1E) is connected to a fourth port (P4). The four-way switch valve (3C) can change between a first state where the first port (P1) is communicated with the second port (P2) and the third port (P3) is communicated with the fourth port (P4) and a second state where the first port (P1) is communicated with the fourth port (P4) and the second port (P2) is communicated with the third port (P3).

In the fifth solving means, when the four-way switch valve (3C) switches a state into the second state, the second compressor (2B) can be used for, for example, both the cold-storage/freezing (45, 51) side and the air-conditioning (41) side. When the four-way switch valve (3C) switches a state into the first state, the second compressor (2B) can be limited only for use in, for example, the cold-storage/freezing (45, 51) side. Also in the fifth solving means, the number of check valves on the suction sides of the compression mechanisms (2D, 2E) is limited to two. As such, chattering noise which generates at the time of switching the four-way switch valve (3C) can be suppressed.

Sixth solving means according to the present invention is premised on a refrigerating apparatus wherein compression mechanisms (2D, 2E) of a refrigerant circuit (1E) having application-side heat exchangers (41, 45, 51) of a plurality of systems are formed by combining three compressors (2A, 2B, 2C), a four-way switch valve (3C) is connected to the suction sides of the compression mechanisms (2D, 2E), and the four-way switch valve (3C) can switch between a first state where a first port (P1) is communicated with a second port (P2) and a third port (P3) is communicated with a fourth port (P4) and a second state where the first port (P1) is communicated with the fourth port (P4) and the second port (P2) is communicated with the third port (P3).

As shown in FIG. 17, in the refrigerating apparatus, a branch pipe (6d) of a suction pipe (6a) of the first compressor (2A) is connected to the first port (P1), and a suction pipe (6b) of the second compressor (2B) is connected to the second port (P2). A branch pipe (6e) of a suction pipe (6c) of the third compressor (2C) and a high-pressure side pipe (28a) of the refrigerant circuit (1E) are merged and connected to the third port (P3), a check valve (7) for checking the flow of a refrigerant directed to the third port (P3) is connected to the branch pipe (6e), and an open/close valve (7j) is connected to the high-pressure side pipe (28a). Further, a high-pressure side pipe (28b) of the refrigerant circuit (1E) is connected to the fourth port (P4), and the high-pressure side pipe (28b) is provided with the check valve (7) for checking the flow of a refrigerant directed to the fourth port (P4).

In the sixth solving means, when the four-way switch valve (3C) switches a state into the first state, for example, cold-storage/freezing can be implemented using the first compressor (2A) and the second compressor (2B), and air-conditioning can be implemented using the third compressor (2C). In this event, for example, the refrigerant on the cold-storage/freezing (45, 51) side is returned to the first compressor (2A) and the second compressor (2B), compressed, and discharged from the two compressors (2A, 2B). On the other hand, the refrigerant on the air-conditioning (41) side is returned to the third compressor (2C), compressed, and discharged from the third compressor (2C).

When the four-way switch valve (3C) switches a state into the second state, for example, cold-storage/freezing can be implemented using the first compressor (2A), and air-conditioning can be implemented using the second compressor (2B) the third compressor (2C). In this event, for example, the refrigerant on the cold-storage/freezing (45, 51) side is returned to the first compressor (2A), compressed, and discharged from the first compressor (2A). On the other hand, the refrigerant on the air-conditioning (41) side is returned to the second compressor (2B) and the third compressor (2C), compressed, and discharged from the two compressors (2B, 2C).

Seventh solving means according to the present invention is characterized in that, in any of the fourth to sixth solving means, the application-side heat exchangers (41, 45, 51) of the plurality of systems include application-side heat exchangers (45, 51) for cold-storage/freezing and an application-side heat exchanger (41) for air-conditioning.

Eighth solving means according to the present invention is characterized in that, in any of the first, fourth, fifth and sixth solving means, the refrigerant circuit (1E) includes a first system side circuit for cold-storage/freezing and a second system side circuit for air-conditioning, a low-pressure gas pipe (15) of the first system side is connected to the suction pipe (6a) of the first compressor (2A), and a low-pressure gas pipe (17) of the second system side is connected to the suction pipe (6c) of the third compressor (2C).

-Effects-

According to the first and second solving means, by switching the communication state of the four-way switch valve (3C), it is possible to select between a state of using, for example, the first compressor (2A) and second compressor (2B) for the cold-storage/freezing side and the third compressor (2C) for the air-conditioning side in the application-side heat exchangers (41, 45, 51) of the plurality of systems, and a state of using the first compressor (2A) for the cold-storage/freezing side and the second compressor (2B) and third compressor (2C) for the air-conditioning side in the application-side heat exchangers (41, 45, 51) of the plurality of systems. That is, in each of the air-conditioning side and the cold-storage/freezing side, while all the three compressors (2A, 2B, 2C) are cannot be used at the same time, the operation capacity can be controlled by using one or two of the compressors depending on the freezing ability.

In addition, the number of check valves (7) provided together with the four-way switch valve (3C) on the suction sides of the compression mechanisms (2D, 2E) is two, not four, so that the reduced number of the check valves (7) is sufficient. This enables suppression of chattering noise which generates in association with changes of the flow direction of the refrigerant with respect to the check valves (7). Further, because of the configuration not using all the three compressors for the cold-storage/freezing side or the air-conditioning side, reduction in ability due to a pressure loss on the suction side can be suppressed.

In a complex configuration using a number of check valves (7), suction pressures of the respective compressors need to be detected, and the differential pressure need to be verified to prevent inconvenience in operation in association with switching operation of the four-way switch valve. However, according to the solving means, simply switching the communication state of the ports in the four-way switch valve (3C) is sufficient to switch between the state of using the first compressor (2A) and second compressor (2B) on the cold-storage/freezing side and the third compressor (2C) on the air-conditioning side and the state of using the first compressor (2A) on the cold-storage/freezing side and the second compressor (2B) and third compressor (2C) on the air-conditioning side. Thus, the operation can easily be performed, and no inconvenience occurs in operation.

Further, according to the third solving means, each of the compressors (2A, 2B, 2C) is formed from a compressor having a variable capacity. As such, the compressors (2A, 2B, 2C) are able to be regulated in capacity and to be finely controlled for operation corresponding to refrigerating ability required in the application-side heat exchangers (41, 45, 51) of each system such as cold-storage/freezing or air-conditioning.

Further, according to the fourth solving means, in a configuration fixedly using, for example, the first compressor (2A) for the cold-storage/freezing side and the third compressor (2C) for the air-conditioning side, it is possible to switch between the state where the second compressor (2B) is used for cold-storage/freezing and the state where the second compressor (2B) used for both cold-storage/freezing and air-conditioning. Also in this configuration, the number of the check valves (7) on the suction sides of the compression mechanisms (2D, 2E) is limited to two, chattering noise can be suppressed and, in addition, reduction in ability due to a pressure loss on the suction side can be suppressed.

According to the fifth solving means, by simply operating the four-way switch valve (3C), it is possible to switch between the state where, for example, the second compressor (2B) is used for both cold-storage/freezing (45, 51) and air-conditioning (41) and the state where the second compressor (2B) is used only for cold-storage/freezing. In addition, chattering noise generating in the operation can be suppressed. In the fourth solving means, the open/close valve (7i), such as a solenoid valve, is used as the switch valve in the fourth solving means. However, in the fifth solving means, the four-way switch valve (3C) is used. Since the refrigerant transmission resistance is lower in the four-way switch valve (3C) than in the solenoid valve (7i), the means exhibits an advantage in that the COP reduction due to the pressure loss on the suction side can be suppressed.

According to the sixth solving means, by simply operating the four-way switch valve (3C), it is possible to switch between the state where the second compressor (2B) is used for cold-storage/freezing (45, 51) and the state where the second compressor (2B) is used for air-conditioning (41). In addition, chattering noise generating in the operation can be suppressed. Further, since no check valve is provided in the branch pipe (6d) of the suction pipe (6a) of the first compressor (2A), a further reduction can be implemented in chattering noise generating when the refrigerant flow direction is changed. In addition, since the pressure loss on the suction side of the second compressor (2B) is reduced, reduction in the ability can further be suppressed.

BEST MODE FOR CARRYING OUT THE INVENTION (First Embodiment)

Hereinafter, First Embodiment of the present invention will be described in detail with reference to the drawings.

Figure 1:
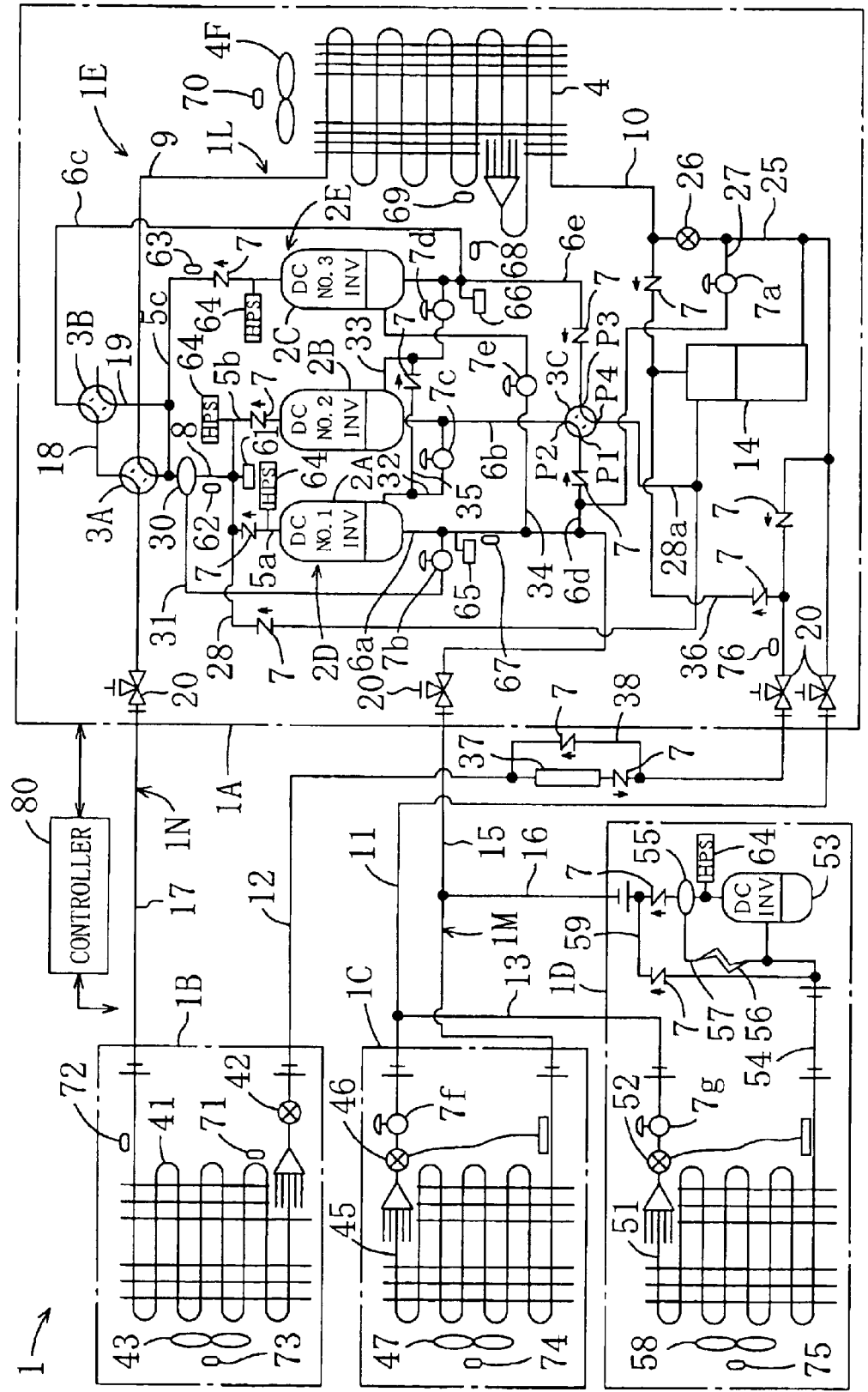
FIG. 1 is a circuit diagram of a refrigerant circuit of a refrigerating apparatus according to First Embodiment of the present invention.

FIG. 1 is a circuit diagram of a refrigerant circuit of a refrigerating apparatus (1) according to First Embodiment of the present invention. The refrigerating apparatus (1) is of a type provided in a convenience store and is formed to perform cooling of the inside of a showcase, i.e., intra-storage spacing, and to perform air-cooling/heating for the inside of the store, i.e., an indoor spacing.

The refrigerating apparatus (1) has an outdoor unit (1A), an indoor unit (1B), a cold-storage unit (1C) and a freezing unit (1D) and comprises a refrigerant circuit (1E) that performs a vapor-compression refrigerating cycle. The refrigerant circuit (1E) includes a first system side circuit for cold-storage and freezing and a second system side circuit for air-conditioning. In addition, the refrigerant circuit (1E) is formed to switch between an air-cooling cycle and an air-heating cycle.

The indoor unit (1B) is formed to perform an air-cooling operation and an air-heating operation by switching therebetween, and is installed in, for example, a sales floor. The cold-storage unit (1C) is placed in a cold-storage showcase to perform cooling of intra-storage air of the showcase. The freezing unit (1D) is placed in a freezing showcase to perform cooling of intra-storage air of the showcase.

<Outdoor Unit>

The outdoor unit (1A) comprises compression mechanisms (2D, 2E) including three compressors (2A, 2B, 2C) and, also, comprises an outdoor heat exchanger (4) as a heat-source side heat exchanger. A first four-way switch valve (3A) and a second four-way switch valve (3B) are connected to the discharge sides of the compression mechanisms (2D, 2E), and a third four-way switch valve (3C) is connected to the suction sides of the compression mechanisms (2D, 2E).

Each of the compressors (2A, 2B, 2C) is formed from, for example, a sealed-type high-pressure dome scroll compressor. The compression mechanisms (2D, 2E) are formed from a first inverter compressor (2A) serving as a first compressor, a second inverter compressor (2B) serving as a second compressor and a third inverter compressor (2C) serving as a third compressor. Each of the inverter compressors (2A, 2B, 2C) is a compressor having a variable capacity in which an electric motor is inverter-controlled, and the capacity thereof can be varied in a stepwise or continuous manner.

The compression mechanisms (2D, 2E) are formed from a first system compression mechanism (2D) and a second system compression mechanism (2E). More specifically, there are two cases: a case where the first inverter compressor (2A) and the second inverter compressor (2B) form the first system compression mechanism (2D) and the third inverter compressor (2C) forms the second system compression mechanism (2E); and a case where the first inverter compressor (2A) forms the first system compression mechanism (2D) and the second inverter compressor (2B) and the third inverter compressor (2C) form the second system compression mechanism (2E).

Discharge pipes (5a, 5b, 5c) of the respective first inverter compressor (2A), second inverter compressor (2B) and the third inverter compressor (2C) are connected to one high-pressure gas pipe (8) (discharge pipe), and the high-pressure gas pipe (8) is connected to a port of the first four-way switch valve (3A). A check valve (7) is provided in each of the discharge pipe (5a) of the first inverter compressor (2A), the discharge pipe (5b) of the second inverter compressor (2B), and the discharge pipe (5c) of the third inverter compressor (2C).

A gas side end of the outdoor heat exchanger (4) is connected to a port of the first four-way switch valve (3A) through an outdoor gas pipe (9). A liquid side end of the outdoor heat exchanger (4) is connected to one end of a liquid pipe (10) serving as a liquid line. A receiver (14) is provided in the midway of the liquid pipe (10), and the other end of the liquid pipe (10) is branched off into a first communication liquid pipe (11) and a second communication liquid pipe (12).

The outdoor heat exchanger (4) is, for example, a cross-fin arranged fin-and-tube heat exchanger, and an outdoor fan (4F) serving as a heat source fan is disposed in proximity thereto.

Suction pipes (6a, 6b) of the respective first inverter compressor (2A) and second inverter compressor (2B) are connected to a low-pressure gas pipe (15). A suction pipe (6c) of the third inverter compressor (2C) is connected to a port of the second four-way switch valve (3B).

A communication gas pipe (17) is connected to a port of the first four-way switch valve (3A). A port of the first four-way switch valve (3A) is connected to a port of the second four-way switch valve (3B) through a connection pipe (18). A port of the second four-way switch valve (3B) is connected to the discharge pipe (5c) of the third inverter compressor (2C) through an auxiliary gas pipe (19). A port of the second four-way switch valve (3B) is formed to be closed port. As such, the second four-way switch valve (3B) may be a three-way switch valve.

The first four-way switch valve (3A) is formed to allow switching between a first state where the high pressure gas pipe (8) is communicated with the outdoor gas pipe (9) and the connection pipe (18) is communicated with the communication gas pipe (17) (see solid lines in FIG. 1) and a second state where the high-pressure gas pipe (8) is communicated with the communication gas pipe (17) and the connection pipe (18) is communicated with the outdoor gas pipe (9) (see the broken lines shown in FIG. 1).

The second four-way switch valve (3B) is formed to allow switching between a first state where the auxiliary gas pipe (19) is communicated with the closed port and the connection pipe (18) is communicated with the suction pipe (6c) of the third inverter compressor (2C) (see the solid lines shown in FIG. 1) and a second state where the auxiliary gas pipe (19) is communicated with the connection pipe (18) and the suction pipe (6c) of the third inverter compressor (2C) is communicated with the closed port (see the broken lines shown in FIG. 1).

The respective discharge pipes (5a, 5b, 5c), the high-pressure gas pipe (8) and the outdoor gas pipe (9) form a high-pressure gas line (1L) in an air-cooling operation. On the other hand, the low-pressure gas pipe (15) and the respective suction pipes (6a, 6b) of the first system compression mechanism (2D) form a first low-pressure gas line (1M). In addition, the communication gas pipe (17) and the suction pipe (6c) of the second system compression mechanism (2E) form a second low-pressure gas line (1N) in the air-cooling operation.

The first communication liquid pipe (11), the second communication liquid pipe (12), the communication gas pipe (17) and the low pressure gas pipe (15) are extended outside from the outdoor unit (1A). Corresponding to these respective liquid pipes (11, 12) and gas pipes (15, 17), closing valves (20) are provided in the outdoor unit (1A). A branch side end portion of the second communication liquid pipe (12) is formed such that a check valve (7) is provided in the outdoor unit (1A), and the refrigerant flows from the receiver (14) toward the closing valve (20).

The third four-way switch valve (3C) is connected to the suction sides of the compressor mechanisms (2D, 2E). The third four-way switch valve (3C) is arranged such that a branch pipe (6d) of the suction pipe (6a) of the first compressor (2A) is connected to the first port (P1) via a check valve (7) for permitting the flow of the refrigerant directed to the first port (P1) of the four-way switch valve (3C); the suction pipe (6b) of the second compressor (2B) is connected to the second port (P2); a branch pipe (6e) of the suction pipe (6c) of the third compressor (2C) is connected to the third port (P3) via a check valve (7) for permitting the flow of the refrigerant directed to the third port (P3); and, further, a high-pressure side pipe (a branch pipe (28a) of a gas vent pipe (28) from the receiver (14) which will be described later) of the refrigerant circuit (1E) is connected to the fourth port (P4). The third four-way switch valve (3C) is formed to allow switching between a first state where a first port (P1) is communicated with a second port (P2) and a third port (P3) is communicated with a fourth port (P4) (see the solid lines shown in FIG. 1) and a second state where the first port (P1) is communicated with the fourth port (P4) and the second port (P2) is communicated with the third port (P3) (see the broken lines shown in FIG. 1).

The liquid pipe (10) is connected to an auxiliary liquid pipe (25) that bypasses the receiver (14). The auxiliary liquid pipe (25) allows the refrigerant to flow mainly in an air-heating, and is provided with an outdoor expansion valve (26) serving as an expansion mechanism. A check valve (7) for permitting only the flow of the refrigerant directed to the receiver (14) is provided between the outdoor heat exchanger (4) and the receiver (14) in the liquid pipe (10). The check valve (7) is positioned between the connection portion of the auxiliary pipe (25) in the liquid pipe (10) and the receiver (14).

A liquid injection pipe (27) is connected between the auxiliary liquid pipe (25) and the low-pressure gas pipe (15) (branch pipe (6d) of the suction pipe (6a) of the first inverter compressor (2A)). A solenoid valve (7a) is provided in the liquid injection pipe (27). The gas vent pipe (28) is connected between an upper portion of the receiver (14) and the discharge pipe (5a) of the first inverter compressor (2A). The check valve (7) for permitting only the flow of the refrigerant directed from the receiver (14) toward the discharge pipe (5a) is provided in the in the gas vent pipe (28).

An oil separator (30) is provided in the high-pressure gas pipe (8). One end of an oil return pipe (31) is connected to the oil separator (30). The oil return pipe (31) is provided with a solenoid valve (7b), and the other end thereof is connected to the suction pipe (6a) of the first inverter compressor (2A).

A first oil-level equalizing pipe (32) is provided between a dome (oil sump) of the first inverter compressor (2A) and the suction pipe (6b) of the second inverter compressor (2B). A solenoid valve (7c) is provided in the first oil-level equalizing pipe (32).

One end of a second oil-level equalizing pipe (33) is connected to a dome of the second inverter compressor (2B). The other end of the second oil-level equalizing pipe (33) is connected to the suction pipe (6c) of the third inverter compressor (2C). A solenoid valve (7d) is provided in the second oil-level equalizing pipe (33). The first oil-level equalizing pipe (32) and the second oil-level equalizing pipe (33) are connected together through a communication pipe (35). The communication pipe (35) is provided with the check valve (7) for permitting only the flow of a refrigerating machine oil directed from the first oil-level equalizing pipe (32) toward the second oil-level equalizing pipe (33).

In addition, a third oil-level equalizing pipe (34) is connected between a dome of the third inverter compressor (2C) and the low-pressure gas pipe (15). The third oil-level equalizing pipe (34) is provided with a solenoid valve (7e).

Further, a branch pipe (36) is connected to the second communication liquid pipe (12) in the outdoor unit (1A). One end of the branch pipe (36) is connected between the check valve (7) and a closing valve (20) in the second communication liquid pipe (12), and the other end thereof is connected between the check valve (7) in the liquid pipe (10) and the receiver (14). The branch pipe (36) is provided with the check valve (7) for permitting only the flow of a refrigerant directed from the second communication liquid pipe (12) toward the receiver (14).

The second communication liquid pipe (12) is provided with a floor heater (37) and the check valve (7) positioned in a downstream side of the floor heater (37) at the air-heating operation in the indoor unit (1B). The check valve (7) checks the flow of the refrigerant in the floor heater (37) in the air-heating operation, and blocks flow of the refrigerant to the floor heater (37) in the air-cooling operation. In addition, the second communication liquid pipe (12) is connected to a bypass path (38) in parallel to the floor heater (37) and the check valve (7). The bypass path (38) is provided with the check valve (7) that permits the flow of the refrigerant bypassing the floor heater (37) in the air-cooling operation. In the convenience store, the floor heater (37) is placed in a cash-counter area where sales clerks work for a long time.

<Indoor Unit>

The indoor unit (1B) has an indoor heat exchanger (41) serving as the second system application-side heat exchanger in the refrigerating apparatus (1), and an indoor expansion valve (42) serving as an expansion mechanism. A gas side of the indoor heat exchanger (41) is connected to the communication gas pipe (17). On the other hand, a liquid side of the indoor heat exchanger (41) is connected to the second communication liquid pipe (12) through the indoor expansion valve (42). The indoor heat exchanger (41) is, for example, a cross-fin arranged fin-and-tube heat exchanger, and an indoor fan (43) serving as an application-side fan is disposed in proximity thereto.

<Cold-Storage Unit>

The cold-storage unit (1C) has a cold-storage heat exchanger (45) (cooling heat exchanger), which serves as the first system application-side heat exchanger in the refrigerating apparatus (1), and a cold-storage expansion valve (46), which serves as an expansion mechanism. A liquid side of the cold-storage heat exchanger (45) is connected to the first communication liquid pipe (11) through the cold-storage expansion valve (46) and a solenoid valve (7f). On the other hand, a gas side of the cold-storage heat exchanger (45) is connected to the low-pressure gas pipe (15).

While the cold-storage heat exchanger (45) is communicated to the suction side of the first system compression mechanism (2D), the indoor heat exchanger (41) is communicated to the suction side of the second system compression mechanism (2E) in the air-cooling operation. In this case, the refrigerant pressure (evaporation pressure) of the cold-storage heat exchanger (45) becomes lower than the refrigerant pressure (evaporation pressure) of the indoor heat exchanger (41). The refrigerant evaporation temperature of the cold-storage heat exchanger (45) becomes, for example, −10° C., and the refrigerant evaporation temperature of the indoor heat exchanger (41) becomes, for example, +5° C. Thereby, the refrigerant circuit (1E) forms a different-temperature evaporation circuit.

The cold-storage expansion valve (46) is, for example, a temperature sensitive expansion valve, and a temperature sensing bulb is attached to the gas side of the cold-storage heat exchanger (45). The cold-storage heat exchanger (45) is, for example, a cross-fin arranged fin-and-tube heat exchanger, and a cold-storage fan (47) serving as an application-side fan is disposed in proximity thereto.

<Freezing Unit>

The freezing unit (1D) has a freezing heat exchanger (51) (cooling heat exchanger) which, similar to the cold-storage heat exchanger (45), serves as the first system application-side heat exchanger in the refrigerating apparatus (1), a freezing expansion valve (52) serving as an expansion mechanism, and a booster compressor (53) serving as a freezing compressor. A liquid side of the freezing heat exchanger (51) is connected to a branch liquid pipe (13) branched off from the first communication liquid pipe (11) through a solenoid valve (7g) and the freezing expansion valve (52).

A gas side of the freezing expansion valve (51) and a suction side of the booster compressor (53) are connected to each other through a connection gas pipe (54). A discharge side of the booster compressor (53) is connected to a branch gas pipe (16) branched off from the low-pressure gas pipe (15). The branch gas pipe (16) is provided with the check valve (7) and an oil separator (55). An oil return pipe (57) having a capillary tube (56) is connected between the oil separator (55) and the connection gas pipe (54).

The refrigerant is compressed at two stages between the booster compressor (53) and the first system compression mechanism (2D) so that the refrigerant evaporation temperature of the freezing heat exchanger (51) becomes lower than the refrigerant evaporation temperature of the refrigerating heat exchanger (45). The refrigerant evaporation temperature of the freezing heat exchanger (51) is set to, for example, −40° C.

The freezing expansion valve (52) is, for example, a temperature sensitive expansion valve, and a temperature sensing bulb is attached to the gas side of the freezing heat exchanger (51). The freezing heat exchanger (51) is, for example, a cross-fin arranged fin-and-tube heat exchanger, and a freezing fan (58) serving as a cooling fan is disposed in proximity thereto.

A bypass pipe (59) having a check valve (7) is connected between the connection gas pipe (54) provided on the suction side of the booster compressor (53) and a downstream side of the check valve (7) of the branch gas pipe (16) provided on a discharge side of the booster compressor (53). The bypass pipe (59) is formed to allow the refrigerant to flow by bypassing the booster compressor (53) upon termination of the booster compressor (53) because of, for example, abnormality occurring therewith.

<Control System>

The refrigerant circuit (1E) are provided with various sensors and various switches. The high-pressure gas pipe (8) of the outdoor unit (1A) is provided with a high-pressure sensor (61), which is pressure detecting means for detecting the high refrigerant pressure, and a discharge temperature sensor (62), which is temperature detecting means for detecting the high-pressure refrigerant temperature. The discharge pipe (5c) of the third inverter compressor (2C) is provided with a discharge temperature sensor (63) serving as temperature detecting means for detecting the high-pressure refrigerant temperature. In addition, pressure switches (64) each opening when the high refrigerant pressure reaches a predetermined value are provided in the discharge pipes (5a, 5b, 5c) of the respective first inverter compressor (2A), second inverter compressor (2B) and third inverter compressor (2C).

The suction pipes (6a, 6c) of the respective first inverter compressor (2A) and third inverter compressor (2C) are provided with low-pressure sensors (65, 66) serving as pressure detecting means for detecting the low refrigerant pressure, and suction temperature sensors (67, 68) serving as temperature detecting means for detecting the low pressure refrigerant temperature.

The outdoor heat exchanger (4) is provided with an outdoor heat exchange sensor (69) serving as temperature detecting means for detecting evaporation temperatures or condensation temperatures which are refrigerant temperatures in the outdoor heat exchanger (4). The outdoor unit (1A) is also provided with an outdoor temperature sensor (70) serving as temperature detecting means for detecting the outdoor air temperature.

The indoor heat exchanger (41) is provided with an indoor heat exchange sensor (71) serving as temperature detecting means for detecting the condensation temperature or evaporation temperature which are refrigerant temperatures in the indoor heat exchanger (41), and is also provided with a gas temperature sensor (72) serving as temperature detecting means for detecting the gas refrigerant temperature in the gas side thereof. Further, the indoor unit (1B) is provided with a room temperature sensor (73) serving as temperature detecting means for detecting indoor air temperatures.

The cold-storage unit (1C) is provided a cold-storage temperature sensor (74) serving as temperature detecting means for detecting intra-storage temperatures of a cold-storage showcase. The freezing unit (1D) is provided with a freezing temperature sensor (75) serving as temperature detecting means for detecting intra-storage temperatures of a freezing showcase. In addition, in a discharge side of the booster compressor (53), a pressure switch (64) is provided that opens when the discharge refrigerant pressure reaches a predetermined value.

Between the check valve (7) and the closing valve (20) in the second communication liquid pipe (12), a liquid temperature sensor (76) is provided that serves as temperature detecting means for detecting the refrigerant temperature in the second communication liquid pipe (12).

Output signals of the various sensors and switches described above are inputted to a controller (80). The controller (80) controls the capacities of the first inverter compressor (2A), the second inverter compressor (2B) and the third inverter compressor (2C) in response to refrigerating capacities required for the refrigerating heat exchanger (45) and the indoor heat exchanger (41), which serve as the refrigerating and freezing application-side heat exchangers, and the indoor heat exchanger (41), which serves as the air-conditioning application-side heat exchanger. In addition, the four-way switch valve (3C) is arranged to allow switching between the first state and second state.

-Operations-

Next, operations performed by the refrigerating apparatus (1) will be described.

<<Air-Cooling Mode>>

First, description will be given of operations that the indoor unit (1B) is used to perform air-cooling of an indoor spacing, and the cold-storage unit (1C) and the freezing unit (1D) are used to perform the operation of cooling of a showcase.

According to the First Embodiment, switching can be implemented between the first air-cooling/refrigerating operation, in which the first inverter compressor (2A) and the second inverter compressor (2B) are used for cold-storage/freezing and the third inverter compressor (2C) is concurrently used for air-cooling, and the second air-cooling/refrigerating operation, in which the first inverter compressor (2A) is used for cold-storage/freezing and the second inverter compressor (2B) and the third inverter compressor (2C) are concurrently used for air-cooling. That is, switching is implemented between the first air-cooling/refrigerating operation and the second air-cooling/refrigerating operation depending on switching the second inverter compressor (2B) for cold-storage/freezing or air-cooling without making a change regarding the use of the first inverter compressor (2A) for cold-storage/freezing and the third inverter compressor (2C) for air-cooling.

<First Air-Cooling/Refrigerating Operation (Boost Operation for Cold-Storage/Freezing)>

Figure 2:
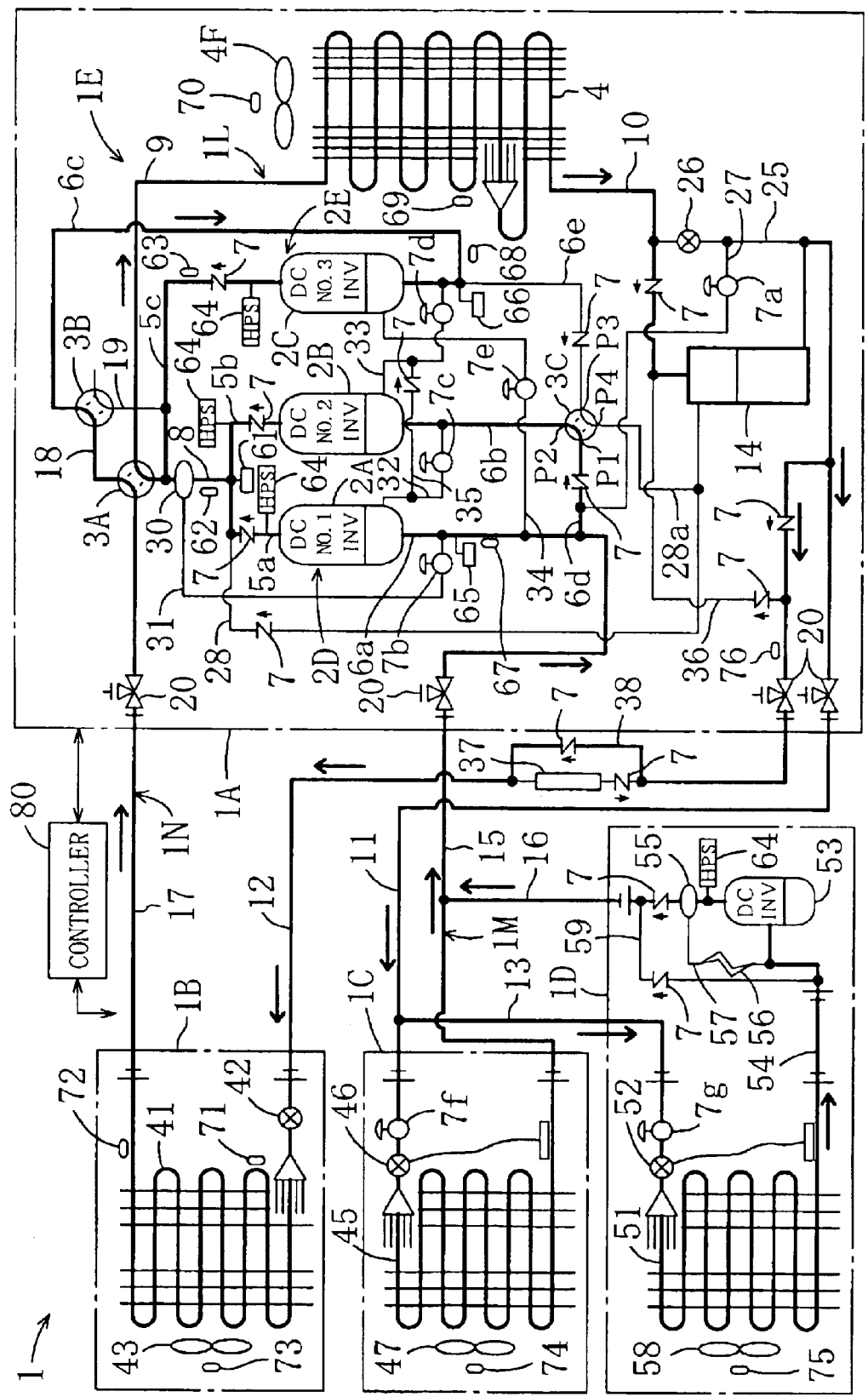
FIG. 2 is a circuit diagram of the refrigerant circuit showing the flow of refrigerant in a first air-cooling/refrigerating operation.

As shown in FIG. 2, in the first air-cooling/refrigerating operation, the first inverter compressor (2A) and the second inverter compressor (2B) form the first system compression mechanism (2D), and the third inverter compressor (2C) forms the second system compression mechanism (2E). In this state, the first inverter compressor (2A), the second inverter compressor (2B) and the third inverter compressor (2C) are driven and, also, the booster compressor (53) is driven.

The first four-way switch valve (3A) and the second four-way switch valve (3B) each switch into the first state (state shown by the solid lines in FIG. 1). In addition, the third four-way switch valve (3C) switches into the first state (state shown by the solid lines in FIG. 1). Further, while the solenoid valve (7f) of the cold-storage unit (1C) and the solenoid valve (7g) of the freezing unit (1D) are opened, the outdoor expansion valve (26) is closed.

In this state, the respective refrigerants discharged from the first inverter compressor (2A) and the third inverter compressor (2C) are merged through the high-pressure gas pipe (8). Then, the merged refrigerant flows from the first four-way switch valve (3A) to the outdoor heat exchanger (4) through the outdoor gas pipe (9), and condenses there.

The condensed liquid refrigerant flows through the liquid pipe (10), and is branched off into the first communication liquid pipe (11) and the second communication liquid pipe (12) through the receiver (14).

The liquid refrigerant flowing through the second communication liquid pipe (12) passes through the bypass path (38) of the floor heater (37), it is decompressed and thereby expanded in the indoor expansion valve (42) and, then, it flows into the indoor heat exchanger (41) and evaporates there. The evaporated gas refrigerant flows through the suction pipe (6c) via the first four-way switch valve (3A) and the second four-way switch valve (3B), and returns into the third inverter compressor (2C).

On the other hand, a part of the liquid refrigerant flowing through the first communication liquid pipe (11) flows into the refrigerating heat exchanger (45) via the refrigeration expansion valve (46) and evaporates there. The other part of the liquid refrigerant flows through the branch liquid pipe (13) into the freezing heat exchanger (51) via the freezing evaporation valve (52) and evaporates there. The gas refrigerant evaporated in the freezing heat exchanger (51) is sucked into the booster compressor (53) to be compressed, and is then discharged into the low pressure gas pipe (16).

The gas refrigerant evaporated in the refrigerating heat exchanger (45) and the gas refrigerant discharged from the booster compressor (53) are merged through the low pressure gas pipe (15), and the merged gas refrigerant returns to the first inverter compressor (2A) and the second inverter compressor (2B).

This cycle is repeatedly performed, thereby air-cooling the indoor spacing, i.e., the interior spacing of the store, and synchronously cooling the intra-storage spacings, i.e., the interior spacings of the cold-storage showcase and the freezing showcase.

Figure 4:
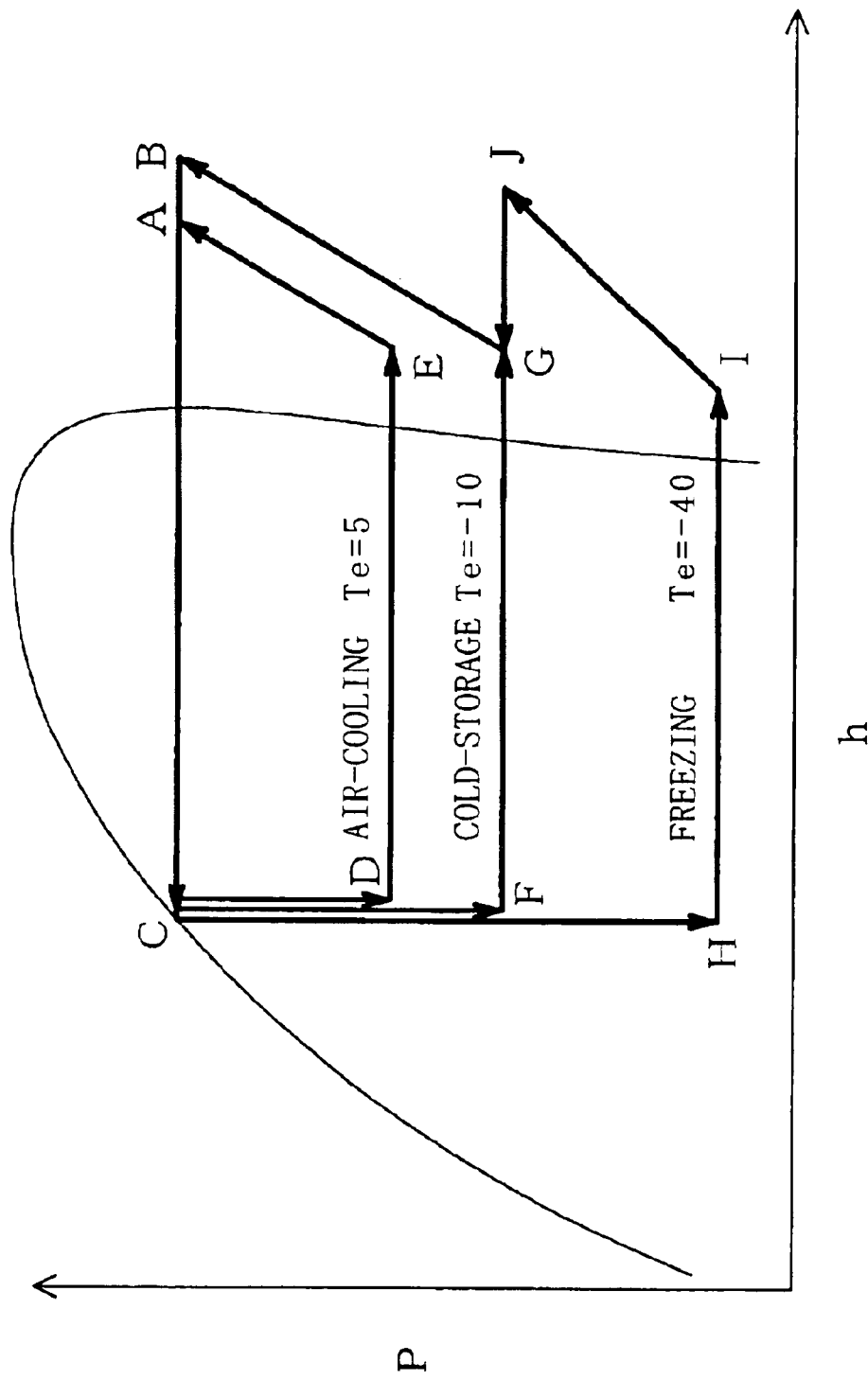
FIG. 4 is a Mollier chart showing behavior of the refrigerant in the first air-cooling/refrigerating operation.

Description will be given of behavior of the refrigerant in the first air-cooling/refrigerating operation with reference to FIG. 4.

The refrigerant is compressed by the third inverter compressor (2C) to point A. In addition, the refrigerant is compressed by the first inverter compressor (2A) and the second inverter compressor (2B) to point B. Then, the refrigerant at point A and the refrigerant at point B are merged and condensed into the refrigerant at point C. A part of the refrigerant at point C is decompressed by the indoor expansion valve (42) to point D, and the decompressed refrigerant evaporates at, for example, +5° C., and the evaporated refrigerant is sucked into the third inverter compressor (2C) at point E.

In addition, a part of the refrigerant at point C is decompressed to point F at the cold-storage expansion valve (46), and it evaporates at −10° C. and the evaporated refrigerant is sucked into the first inverter compressor (2A) and the second inverter compressor (2B) at point G.

In addition, a part of the refrigerant at point C is sucked into the booster compressor (53). As such, the refrigerant is decompressed by the freezing evaporation valve (52) to point H, and it evaporates at −40° C. and the evaporated refrigerant is sucked into the booster compressor (53) at point I. The refrigerant compressed by the booster compressor (53) to point J is sucked into the first inverter compressor (2A) and the second inverter compressor (2B) at point G.

Thus, the refrigerant of the refrigerant circuit (1E) is evaporated by the first system compression mechanism (2D) and the second system compression mechanism (2E) at the different temperatures, and is processed by the two-stage decompressions in the booster compressor (53) to have three evaporation temperatures.

<Second Air-Cooling/Refrigerating Operation (Boost Operation for Air-Cooling)>

Figure 3:
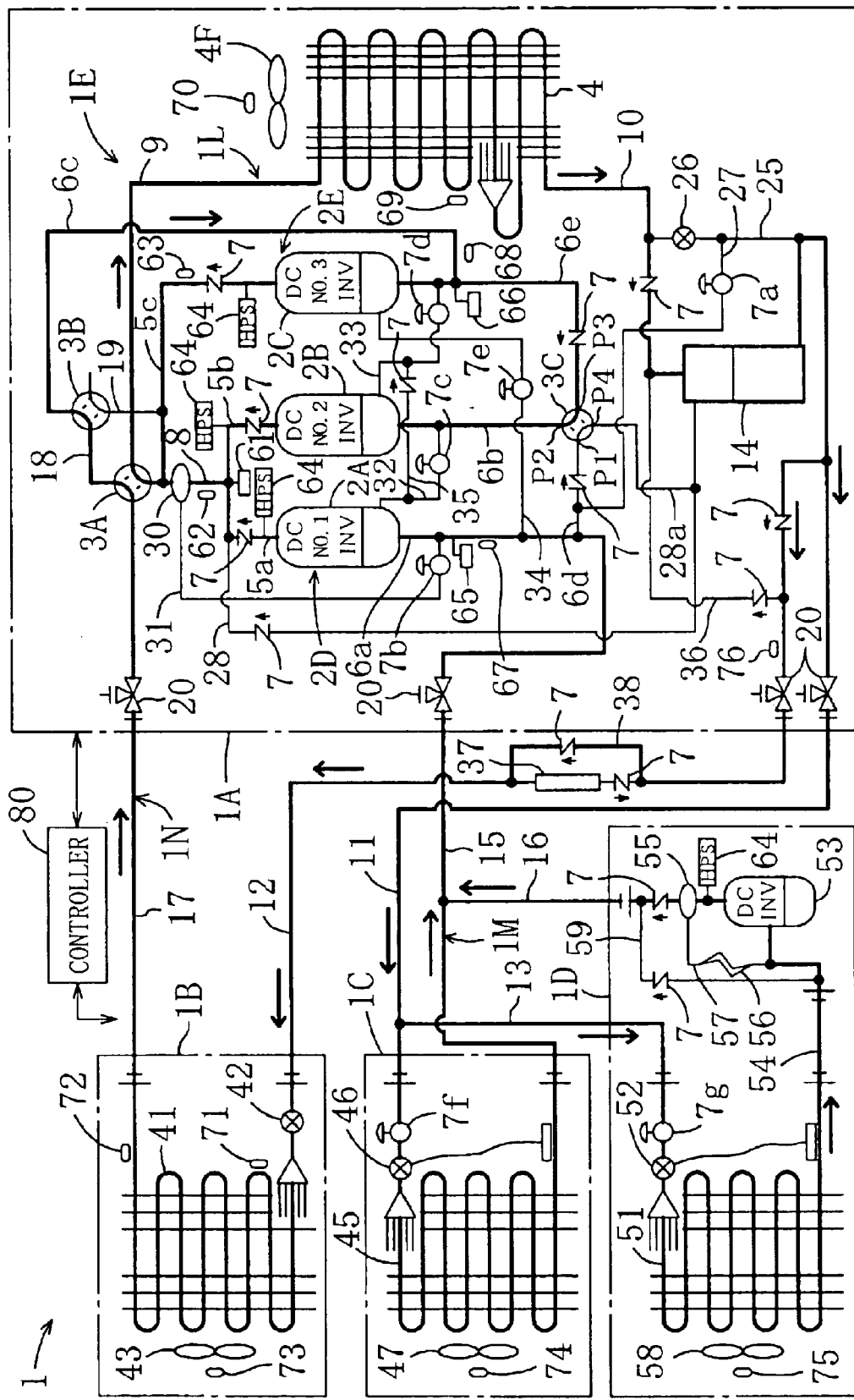
FIG. 3 is a circuit diagram of the refrigerant circuit showing the flow of the refrigerant in a second air-cooling/refrigerating operation.

The second air-cooling/refrigerating operation is performed when the air-cooling ability of the indoor unit (1B) is deficient in the first air-cooling/refrigerating operation. As shown in FIG. 3, the second air-cooling/refrigerating operation is substantially the same as the first air-cooling/refrigerating operation. The second air-cooling/refrigerating operation differs from the first air-cooling/refrigerating operation in that the four-way switch valve (3C) therein switches into the second state (state shown by the broken lines in FIG. 1).

As such, in the second air-cooling/refrigerating operation, as in the first air-cooling/refrigerating operation, the refrigerants discharged from the first inverter compressor (2A), second inverter compressor (2B) and third inverter compressor (2C) are condensed in the outdoor heat exchanger (4), and then evaporate in the indoor heat exchanger (41), cold-storage heat exchanger (45) and freezing heat exchanger (51).

The refrigerant evaporated in the indoor heat exchanger (41) returns to the second inverter compressor (2B) and the third inverter compressor (2C), and the refrigerant evaporated in the cold-storage heat exchanger (45) and the freezing heat exchanger (51) returns into the first inverter compressor (2A).

<Operation Control>

Capacity control of the compressors in the air-cooling mode and switch control between the modes of the first air-cooling/refrigerating operation and the second air-cooling/refrigerating operation will now be described herein with reference to flowcharts shown in FIGS. 5 to 10. In these flowcharts, the first inverter compressor (2A) is represented by "DC1", the second inverter compressor (2B) is represented by "DC2", and the third inverter compressor (2C) is represented by "DC3".

First, operation control in the cold-storage/freezing side will be described with reference to FIGS. 5 to 8. Referring to the flowchart shown in FIG. 5, in step ST1, it is discriminated that whether the second inverter compressor (2B) is used to boost cold-storage/freezing ability (whether it is in the first air-cooling/refrigerating operation). When the discrimination result in step ST1 is "No", the process proceeds to step ST2, and it is discriminated from the intra-storage temperature and the set temperature of the showcase that whether the cold-storage/freezing ability is deficient.

In an event the cold-storage/freezing ability is deficient, a subroutine of step ST3 is executed to perform the capacity control of the first inverter compressor (2A). As shown in the flowchart of FIG. 6, first, it is discriminated in step ST11 that whether the operation frequency of the first inverter compressor (2A) is maximum, that is, whether the first inverter compressor (2A) is operating at a maximum capacity. When the operation frequency of the first inverter compressor (2A) is maximum, the process proceeds to step ST12 and switch-control is implemented such that the second inverter compressor (2B) is used for cold-storage/freezing in order to solve the problem of deficiency of the cold-storage/freezing ability. Specifically, the third four-way switch valve (3C) is set to the operation shown by the solid lines in FIG. 1 (this state of the four-way switch valve (3C) refers to the OFF state), and the operation frequency of the second inverter compressor (2B) is control to increase to obtain a necessary capacity. Thereafter, the process returns to the flowchart shown in FIG. 5.

When the operation frequency of the first inverter compressor (2A) is not maximum in step ST11, the process proceeds to step ST13, and the operation frequency of the first inverter compressor (2A) is increased corresponding to the deficiency of the cold-storage/freezing ability. Thereafter, the process returns to the flowchart shown in FIG. 5.

Figure 5:
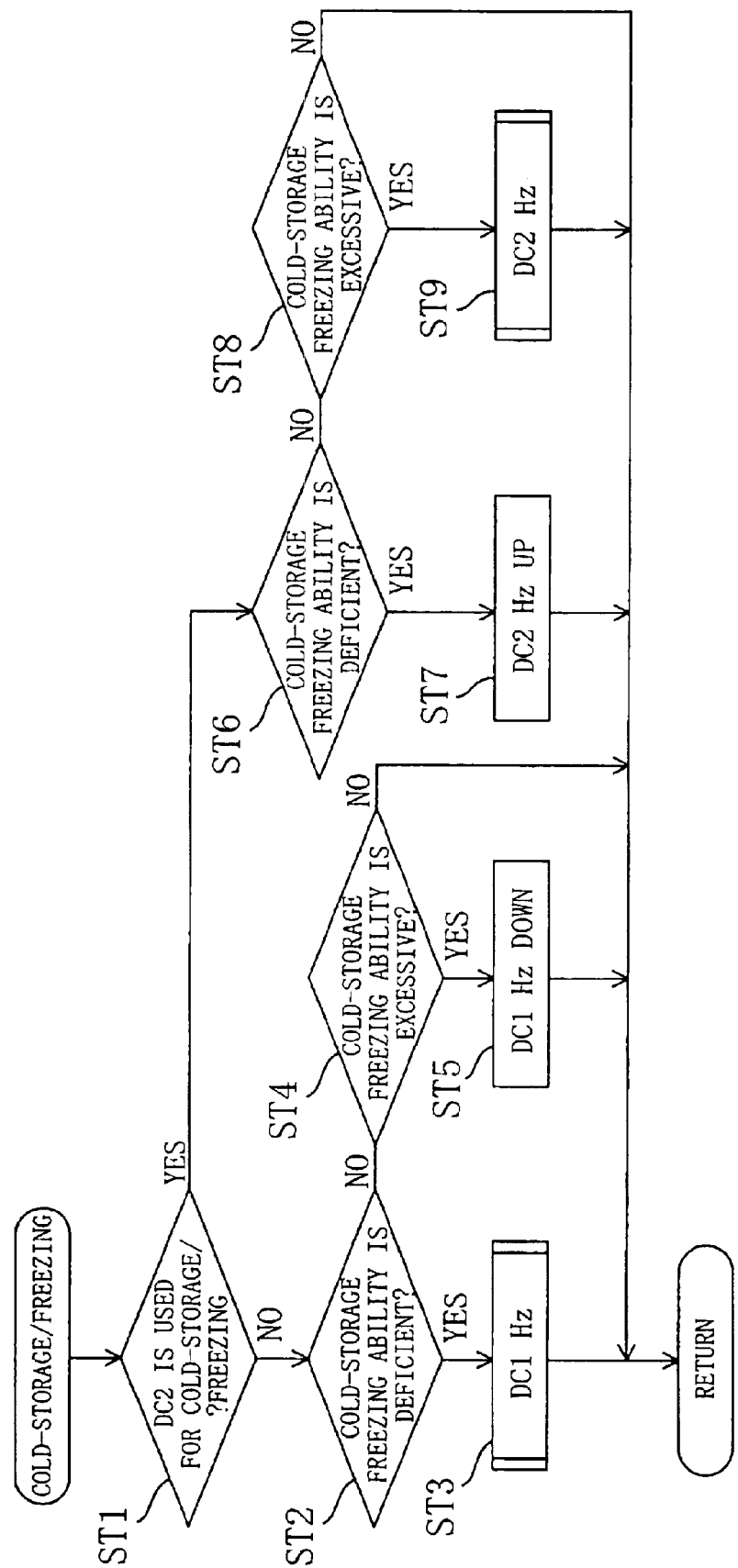
FIG. 5 is a flowchart showing operational control in a cold-storage/freezing side.
Figure 6:
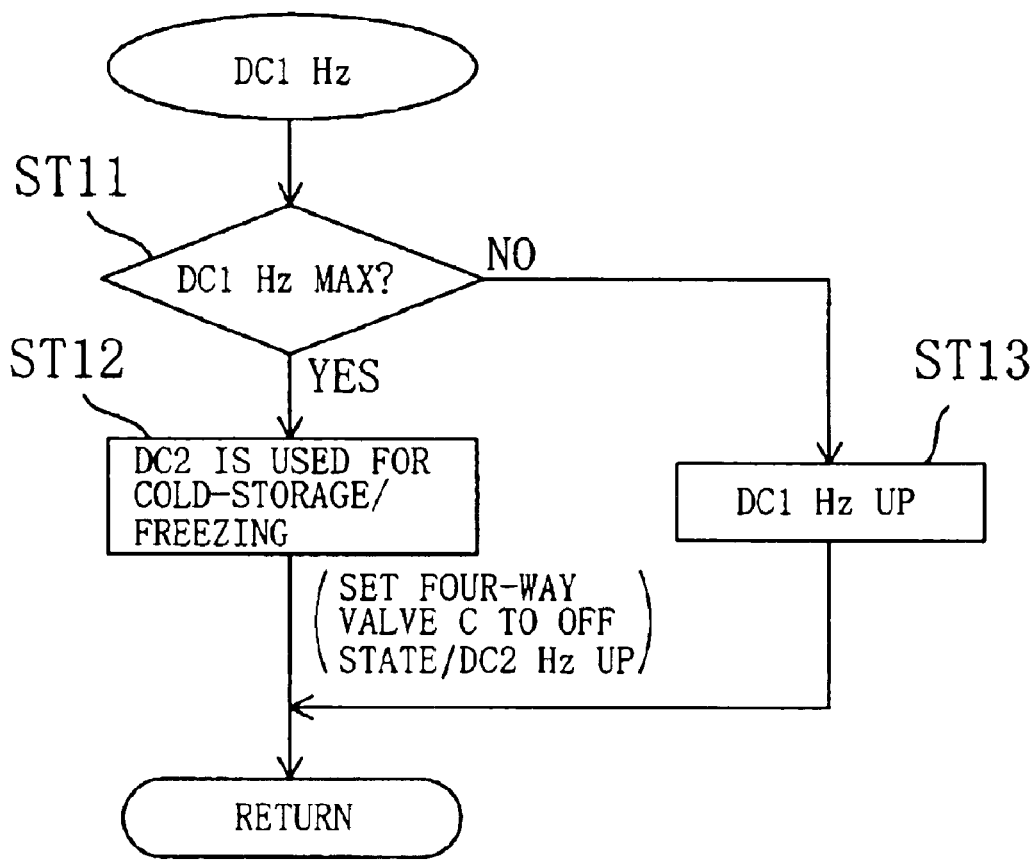
FIG. 6 is a flowchart showing a subroutine regarding capacity control of a first inverter compressor in FIG. 5.

When the cold-storage/freezing ability is not deficient (including the case where the problem of deficiency of the cold-storage/freezing ability has been solved through execution of the step ST13 shown in FIG. 6) in step ST2 shown in FIG. 5, the process proceeds to step ST4 and it is discriminated that whether the cold-storage/freezing ability is excessive. When the ability is not excessive, the process returns to step ST1 since it is possible to obtain a proper ability. When the ability is excessive, the operation frequency of the first inverter compressor (2A) is decreased in step ST5, and the process returns to step ST1.

When it is determined that whether the second inverter compressor (2B) is used for cold-storage/freezing in step ST1, the process proceeds to step ST6. In step ST6, it is discriminated that whether the cold-storage/freezing ability is deficient. When the ability is deficient, the operation frequency of the second inverter compressor (2B) is increased in step ST17, and the process returns to step ST1.

As a result of the discrimination in step ST6, when it is determined that the cold-storage/freezing ability is not deficient, it is discriminated in step ST8 that whether the cold-storage/freezing ability is excessive. When the ability is not excessive, since a proper ability is obtained, the process returns to step ST1 without controlling the operation frequency to be adjusted.

When it is determined in step ST8 that the cold-storage/freezing ability is excessive, capacity control is performed for the second inverter compressor (2B) through the execution of a subroutine of step ST9. In the subroutine, it is discriminated in step ST21 of the flowchart shown in FIG. 7 that whether the operation frequency of the second inverter compressor (2B) is minimum. When the operation frequency is minimum, the process proceeds to step ST22, a subroutine shown in a flowchart shown in FIG. 8 is executed, and the process returns to the flowchart of FIG. 1. When it is determined in step ST21 that the operation frequency is not minimum, the process proceeds to step ST23, the operation frequency of the second inverter compressor (2B) is decreased, and the process returns to the flowchart shown in FIG. 1.

Figure 7:
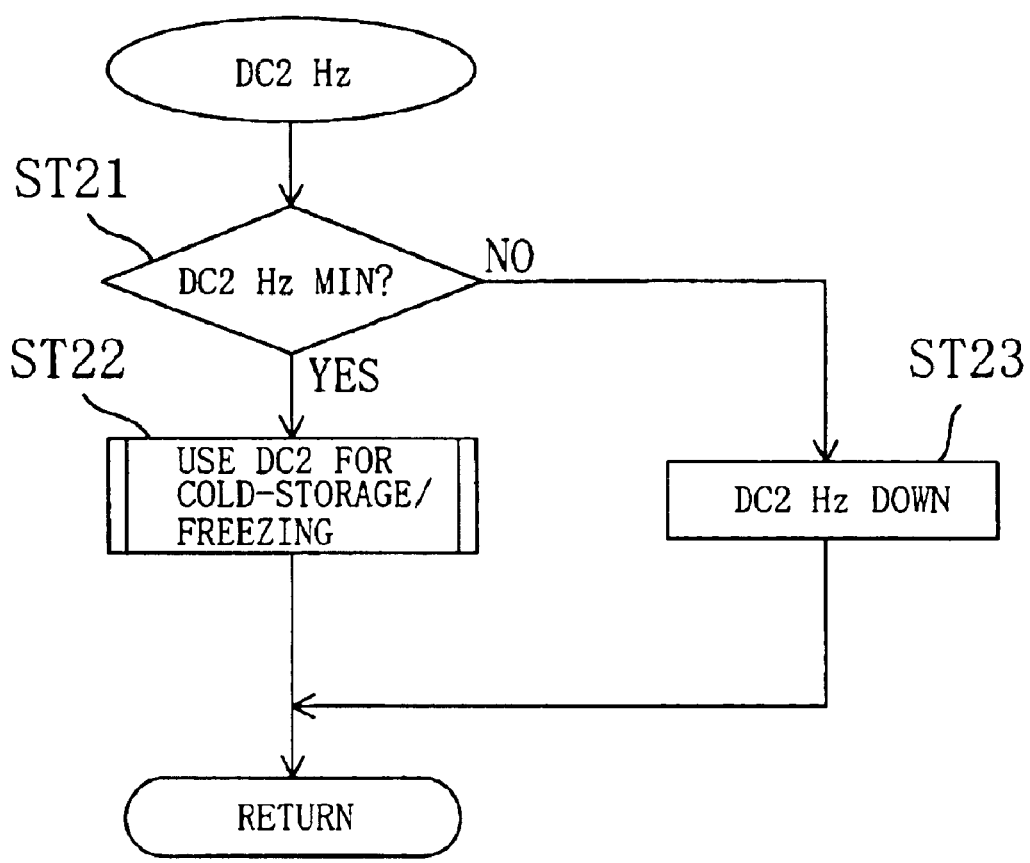
FIG. 7 is a flowchart showing a subroutine regarding capacity control of a second inverter compressor in FIG. 5.
Figure 8:
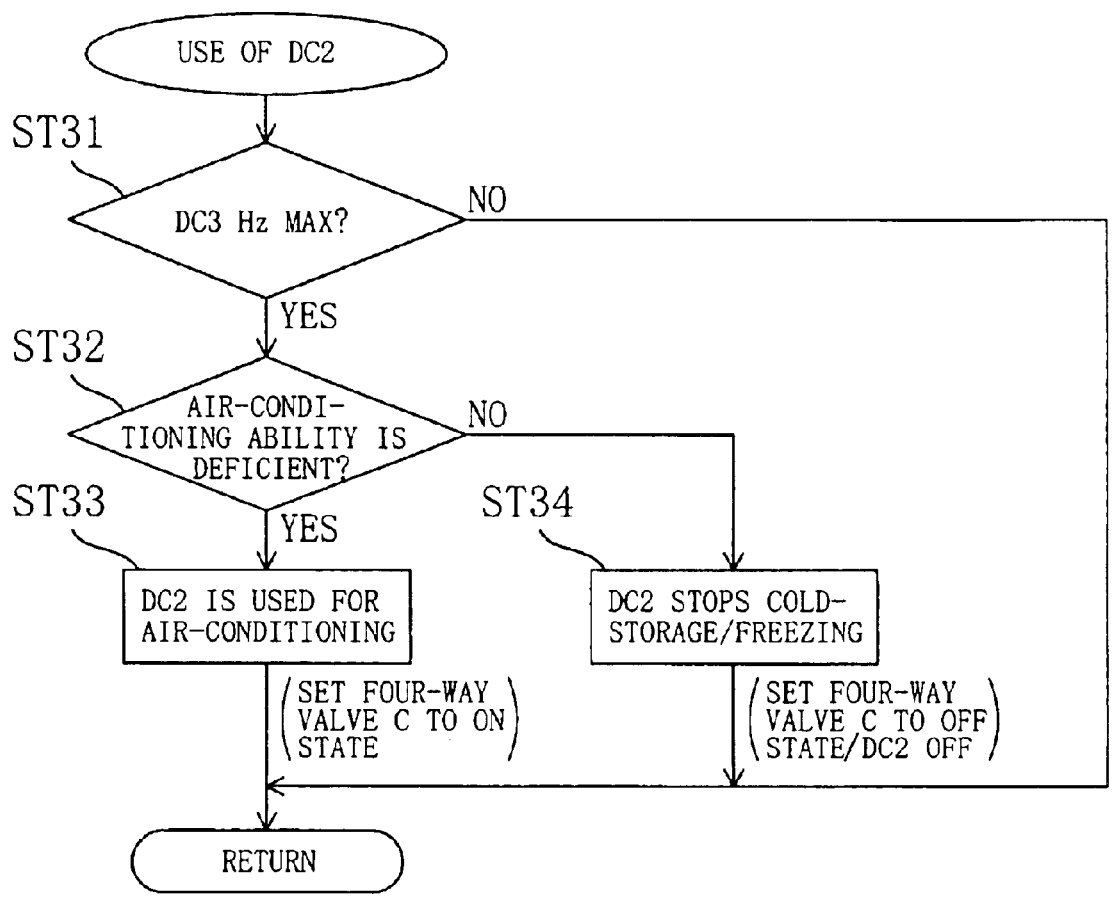
FIG. 8 is a flowchart showing a subroutine regarding switch control of the second inverter compressor in FIG. 7.

At the time of execution of step ST22 shown in FIG. 7, the second inverter compressor (2B) is used for cold-storage/freezing and is capacity-controlled with the minimum frequency. However, the ability of the compressor is excessive. In this case, first, it is discriminated in step ST31 shown in FIG. 8 that whether the operation frequency of the third inverter compressor (2C) is maximum. When the frequency is maximum, it is discriminated in step ST32 that whether the air-conditioning ability is deficient.

When the air-conditioning ability is deficient, the second inverter compressor (2B) is used for the cold-storage/freezing while the cold-storage/freezing ability is excessive. As such, the third four-way switch valve (3C) is switched to be ON, whereby the second inverter compressor (2B) is controlled to be used for the air-conditioning in step ST33. When it is determined in step ST32 that the air-conditioning ability is not deficient, the third four-way switch valve (3C) is set to the state shown by the solid lines in FIG. 1 (OFF), and the second inverter compressor (2B) is thereby stopped in step ST34.

When the operation frequency of the third inverter compressor (2C) is not maximum in step ST31, the air-conditioning ability can be adjusted usable by capacity-controlling the third inverter compressor (2C). Accordingly, the second inverter compressor (2B) is not operated, and the process returns from the flowchart shown in FIG. 7 to the flowchart shown in FIG. 5.

Next, operation control in the air-cooling side will be described with reference to FIGS. 9 and 10.

It is discriminated in step ST51 that whether the second inverter compressor (2B) is used for air-conditioning (whether the second inverter compressor (2B) is in the second air-cooling/refrigerating operation). When the second inverter compressor (2B) is used for air-conditioning, an "Air-Conditioning Control" subroutine in step ST52 shown as practical control in FIG. 10 is executed. When the second inverter compressor (2B) is not used for air-conditioning, the process proceeds to step ST53.

In the "Air-Conditioning Control" subroutine, it is discriminated that whether the air-conditioning ability is deficient in step ST61. When the air-conditioning ability is deficient, the operation frequency of the second inverter compressor (2B) is increased in step ST62 to thereby solve the problem of ability deficiency, and the process returns to the flowchart shown in FIG. 9.

When it is determined in step ST61 that the air-conditioning ability is not deficient, it is discriminated that whether the air-conditioning ability is excessive in step ST63. When the ability is not excessive, the process returns to the flowchart shown in FIG. 9 without adjusting the operation frequency of the second inverter compressor (2B) since it is possible to obtain a proper ability. When the air-conditioning ability is excessive, the process proceeds to step ST64 and it is discriminated that whether the operation frequency of the second inverter compressor (2B) is minimum. When the frequency is minimum, the second inverter compressor (2B) is stopped in step ST65; whereas when the capacity is not minimum, the operation frequency of the second inverter compressor (2B) is decreased, and the process returns to the flowchart shown in FIG. 9.

Figure 9:
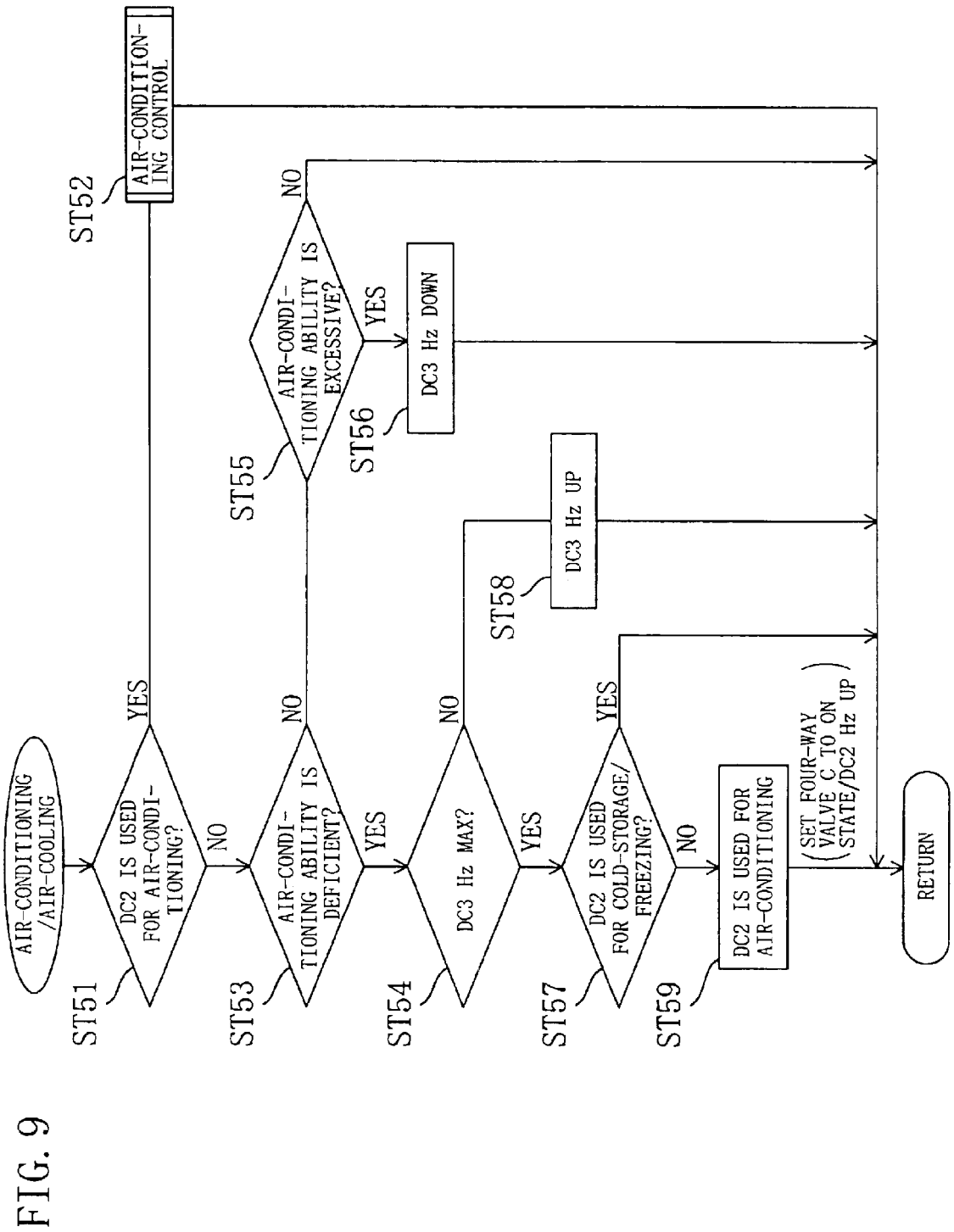
FIG. 9 is a flowchart showing operational control in an air-conditioning side.
Figure 10:
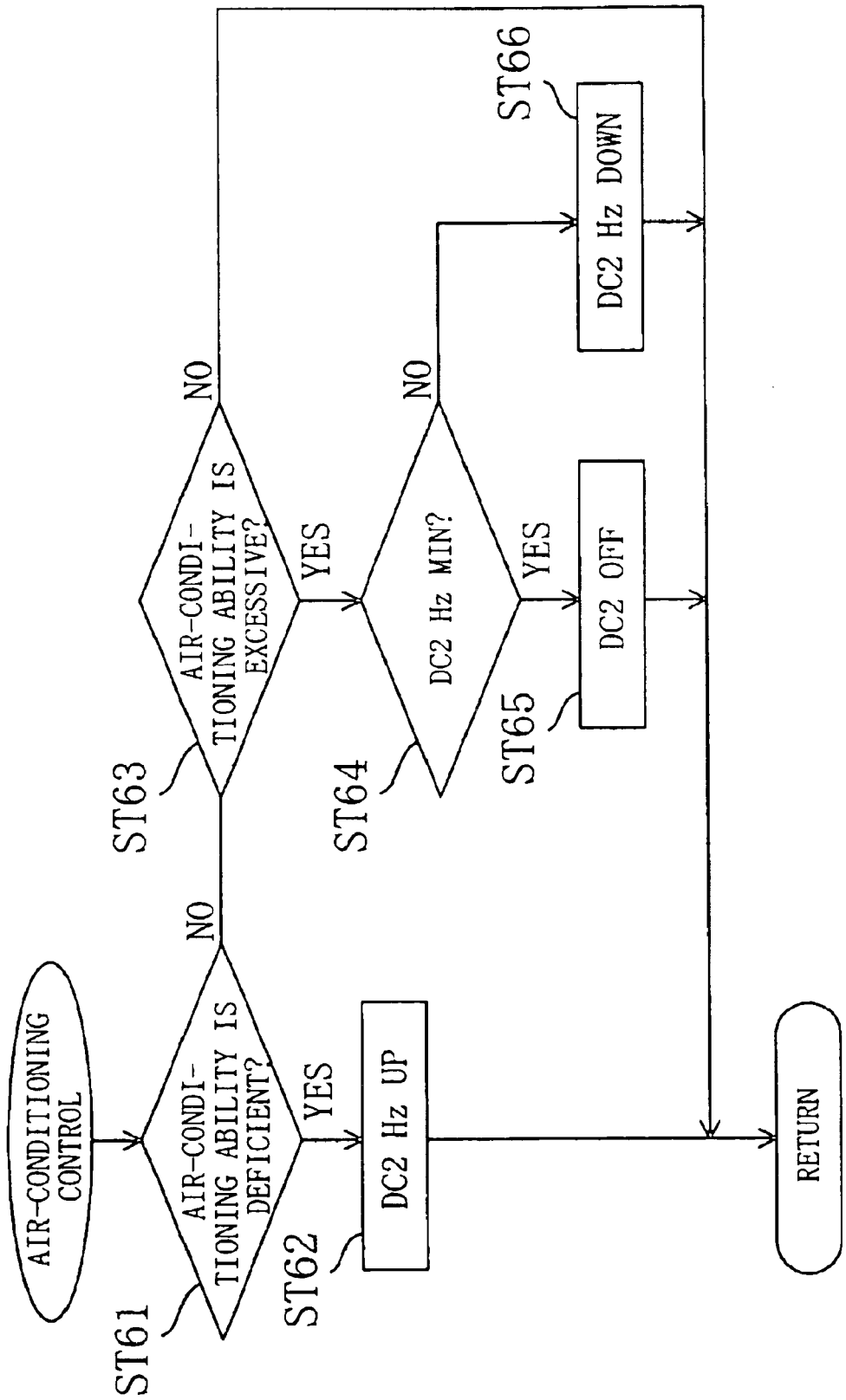
FIG. 10 is a flowchart showing a subroutine regarding control operation of the second inverter compressor in FIG. 9.

When it is determined in step ST51 shown in FIG. 9 that the second inverter compressor (2B) is not used for air-conditioning, it is discriminated in step ST53 that whether the air-conditioning ability is deficient. When the air-conditioning ability is deficient, it is discriminated in step ST54 that whether the operation frequency of the third inverter compressor (2C) is maximum. When the air-conditioning ability is not deficient, it is discriminated in step ST55 that whether the air-conditioning ability is excessive.

When it is determined in step ST55 that the air-conditioning ability is excessive, the operation frequency of the third inverter compressor (2C) is decreased in step ST56, and the process returns to step ST51. Then, when it is determined that the air-conditioning ability is not excessive, i.e., the air-conditioning ability is proper, the process returns to step ST51 without adjusting the operation frequency.

On the other hand, when it is determined in step ST54 that the operation frequency of the third inverter compressor (2C) is maximum, it is discriminated in step ST57 that whether the second inverter compressor (2B) is used for cold-storage/freezing. When the operation frequency of the third inverter compressor (2C) is not maximum, the operation frequency of the third inverter compressor (2C) is increased in step ST58, thereby increasing the air-conditioning ability, and the process returns to step ST51.

When it is determined in step ST57 that the second inverter compressor (2B) is not used for cold-storage/ freezing, the second inverter compressor (2B) is stopped. As such, the process proceeds to step ST59, and the state of the second inverter compressor (2B) is switched therein to the operation that uses the second inverter compressor (2B) for air-conditioning. When it is determined in step ST57 that the second inverter compressor is used for cold-storage/ freezing, the cold-storage/freezing ability cannot be reduced. As such, the process returns to step ST51 without causing the operation state to vary.

As described above, in First Embodiment, ordinarily, the second inverter compressor (2B) is used for cold-storage/ freezing in order to obtain necessary cold-storage/freezing ability. However, when the cold-storage/freezing ability is excessive while the air-conditioning ability is deficient, the state of the four-way switch valve (3C) is switched to use the second inverter compressor (2B) for air-conditioning. In this case, simple ON/OFF switching of the four-way switch valve (3C) enables switching to be implemented between the first air-cooling/refrigerating operation and the second air-cooling/refrigerating operation, thus enabling the operation to be facilitated.

In this apparatus, although detailed description is omitted herein, operations other than those described above can be implemented by appropriately controlling the respective compressors (2A, 2B, 2C), four-way switch valves (3A, 3B, 3C), expansion valves (42, 46, 52) and the like. For example, the control enables only the operation of indoor air-cooling by using the indoor unit (1B) and only the operation of cooling only the intra-storage spacings of the showcase by using the cold-storage unit (1C) and the freezing unit (1D).

<<Air-Heating Mode>>

Next, description will be given of operations in which the indoor unit (1B) is used for indoor air-heating, and the refrigerating unit (1C) and the freezing unit (1D) are used for cooling the showcase.

In the operation mode, without the outdoor heat exchanger (4) being used, the first inverter compressor (2A) and the second inverter compressor (2B) are activated. Thereby, through 100% heat recovery, the first air-heating/ refrigerating operation can be implemented that performs air-heating of the indoor unit (1B) and cooling of the cold-storage unit (1C) and the freezing unit (1D). In addition, the second air-heating/freezing operation can be implemented that uses the outdoor heat exchanger (4) when the air-heating ability of the indoor unit (1B) is excessive in the first air-heating/refrigerating operation. Further, the third air-heating/freezing operation can be implement that activates the third inverter compressor (2C) and uses the outdoor heat exchanger (4) when the air-heating ability of the indoor unit (1B) is deficient in the first air-heating/ refrigerating operation.

<<First Air-Heating/Refrigerating Operation>>

Figure 11:
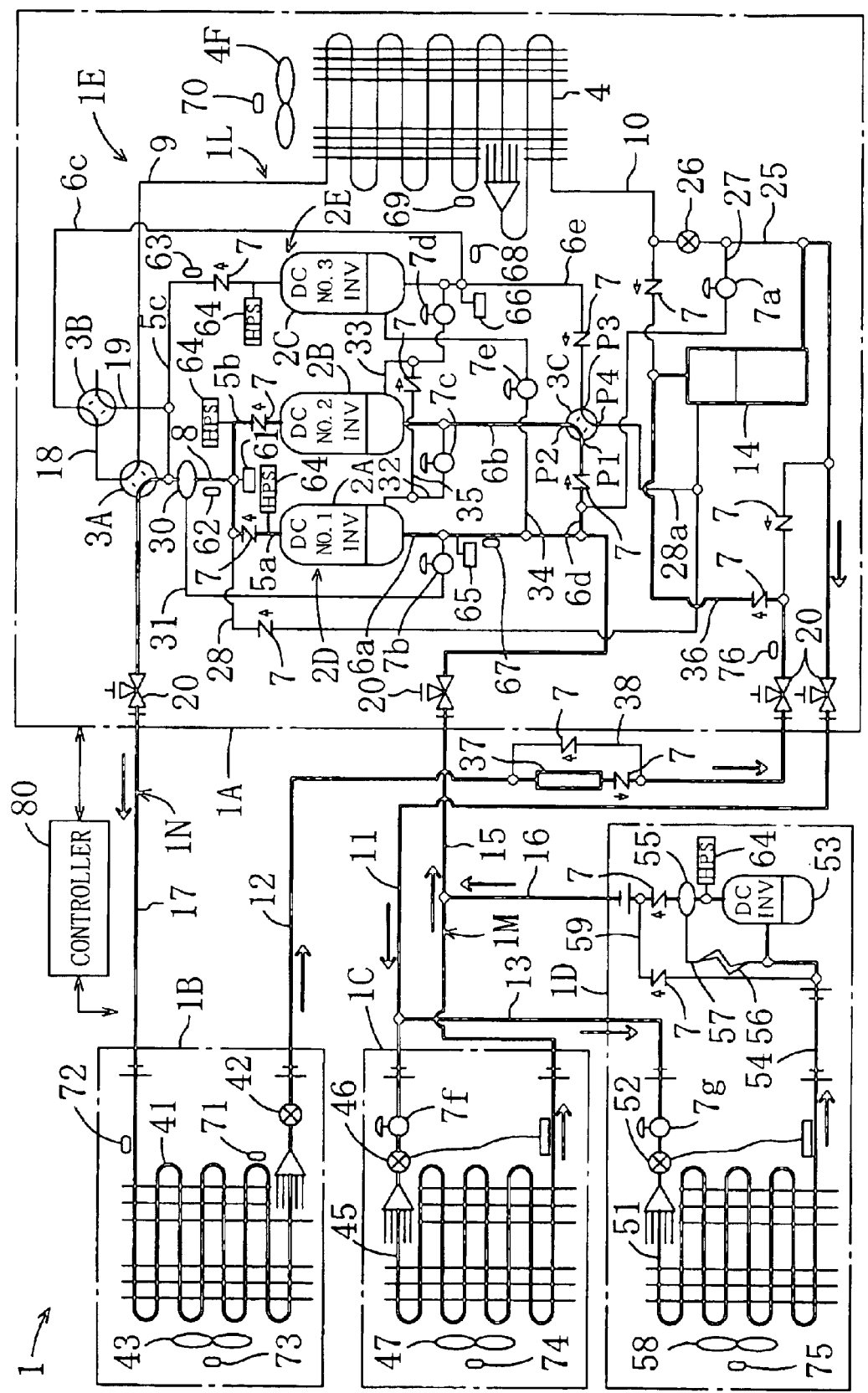
FIG. 11 is a circuit diagram of a refrigerant circuit showing the flow of refrigerant in a first air-heating/freezing operation.

As described above, the first air-heating/refrigerating operation is a heat recovery operation that implements air-heating of the indoor unit (1B) and cooling of the cold-storage unit (1C) and the freezing unit (1D) without using the outdoor heat exchanger (4). As shown in FIG. 11, in the first air-heating/refrigerating operation, the first inverter compressor (2A) and the second inverter compressor (2B) form the first system compression mechanism (2D), and the third inverter compressor (2C) forms the second system compression mechanism (2E). In this state, the first inverter compressor (2A) and the second inverter compressor (2B) are driven and, in addition, the booster compressor (53) is driven. However, the third inverter compressor (2C) is stopped.

The state of the first four-way switch valve (3A) switches into the second state, and the state of the second four-way switch valve (3B) switches into the first state. Further, the state of the third four-way switch valve (3C) switches into the first state. In addition, while the solenoid valve (7f) of the cold-storage unit (1C) and the solenoid valve (7g) of the freezing unit (1D) are opened, the outdoor expansion valve (26) is closed.

In this state, the refrigerants discharged from the first inverter compressor (2A) and the second inverter compressor (2B) flow from the first four-way switch valve (3A) to the indoor heat exchanger (41) via the communication gas pipe (17), and the refrigerants condense there. Then, the condensed refrigerant flows through the floor heater (37) when flowing through the second communication liquid pipe (12), and further flows through the first communication liquid pipe (11) from the branch pipe (36) via the receiver (14).

A part of the liquid refrigerant flowing through the first communication liquid pipe (11) flows into the cold-storage heat exchanger (45) via the refrigeration expansion valve (46), and evaporates there. The other part of the liquid refrigerant flowing through the first communication liquid pipe (11) flows through the branch liquid pipe (13), then flows to the freezing heat exchanger (51) via the freezing expansion valve (52), and evaporates there. The gas refrigerant evaporated in the freezing heat exchanger (51) is sucked into the booster compressor (53) to be compressed, and is then discharged into the low-pressure gas pipe (16).

The gas refrigerant evaporated in the cold-storage heat exchanger (45) and the gas refrigerant discharged from the booster compressor (53) are merged through the low-pressure gas pipe (15), and the merged gas refrigerant returns to the first inverter compressor (2A) and second inverter compressor (2B). This cycle is repeatedly performed, thereby performing air-heating of the indoor spacing, i.e., the interior spacing of the store, performing floor-heating, and, also, cooling the intra-storage spacings, i.e., the interior spacings of the cold-storage showcase and the freezing showcase. In this manner, in the first air-heating/cold-storage operation, the cooling ability (vaporization heat amounts) of the cold-storage unit (1C) and freezing unit (1D) are balanced with the air-heating ability (condensation heat amount) of the indoor unit (1B), thereby achieving 100% heat recovery.

<Second Air-Heating/Refrigerating Operation>

Figure 12:
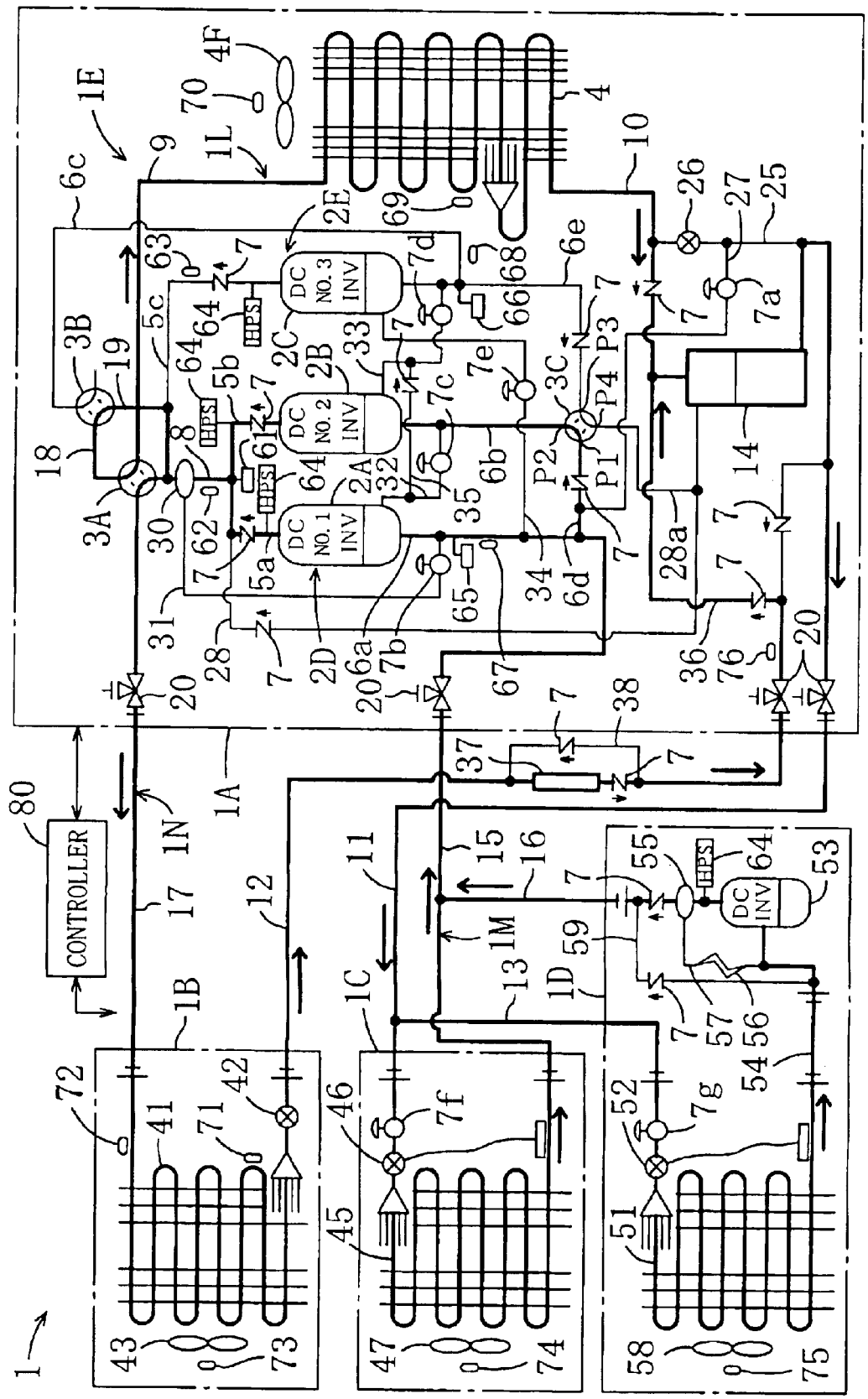
FIG. 12 is a circuit diagram of a refrigerant circuit showing the flow of refrigerant in a second air-heating/freezing operation.

When the air-heating ability of the indoor unit (1B) in the first air-heating/refrigerating operation is excessive, the second air-heating/refrigerating operation is performed. As shown in FIG. 12, in the second air-heating/refrigerating operation, the first inverter compressor (2A) and second inverter compressor (2B) form the first system compression mechanism (2D), and the third inverter compressor (2C) forms the second system compression mechanism (2E). In this state, the first inverter compressor (2A) and the second inverter compressor (2B) are driven and, also, the booster compressor (53) is driven. However, the third inverter compressor (2C) is stopped, as in the first air-heating/ refrigerating operation. The four-way switch valves (3A, 3B, 3C), the expansion valves (42, 46, 52) and the like are set to be the same as the first air-heating/refrigerating operation described above, except that the state of the second four-way switch valve (3B) is switched into the second state.

In this state, as in the first air-heating/refrigerating operation, a part of the refrigerants discharged from the first inverter compressor (2A) and the second inverter compressor (2B) flows to the indoor heat exchanger (41), and the refrigerant condenses there. Then, the condensed liquid refrigerant flows through the floor heater (37), and flows into the receiver (14) from the branch pipe (36).

The other part of the refrigerants discharged from the first inverter compressor (2A) and the second inverter compressor (2B) flow through the outdoor gas pipe (9) from the auxiliary gas pipe (19) via the second four-way switch valve (3B) and the first four-way switch valve (3A), and condense in the outdoor heat exchanger (4). The condensed liquid refrigerant then flows through the liquid pipe (10), and is merged with the liquid refrigerant discharged from the floor heater (37). The merged refrigerant flows into the receiver (14), and then flows through the first communication liquid pipe (11).

Thereafter, a part of the liquid refrigerant flowing through the first communication liquid pipe (11) flows into the cold-storage heat exchanger (45), and evaporates there. The other part of the liquid refrigerant flowing through the first communication liquid pipe (11) flows into the freezing heat exchanger (51), and evaporates there. The gas refrigerant evaporated in the cold-storage heat exchanger (45) and gas refrigerant discharged from the booster compressor (53) are merged in the low pressure gas pipe (15), and the merged refrigerant returns into the first inverter compressor (2A) and second inverter compressor (2B). This cycle is repeatedly performed, thereby performing air-heating of the indoor spacing, i.e., the interior spacing of the store, performing floor-heating and, also, cooling the intra-storage spacings, i.e., the interior spacings of the refrigerating showcase and the freezing showcase.

In this manner, in the second air-heating/freezing operation, the cooling ability (vaporization heat amounts) of the cold-storage unit (1C) and freezing unit (1D) are not balanced with the air-heating ability (condensation heat amount) of the indoor unit (1B), and excessive condensation heat is dissipated through the outdoor heat exchanger (4).

<Third Air-Heating/Refrigerating Operation>

Figure 13:
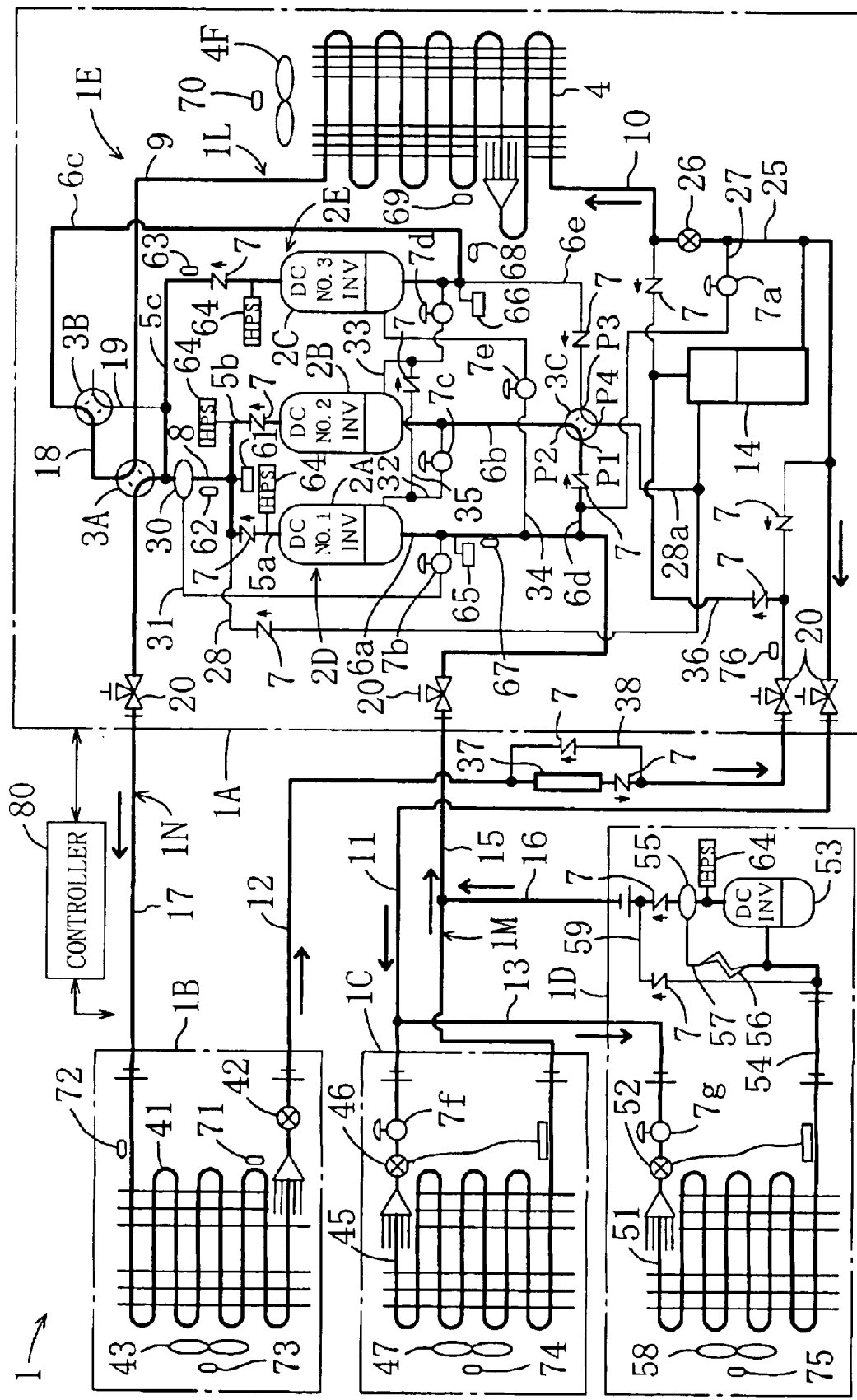
FIG. 13 is a circuit diagram of a refrigerant circuit showing the flow of refrigerant in a third air-heating/freezing operation.

When the air-heating ability of the indoor unit (1B) in the first air-heating/refrigerating operation is deficient, the third air-heating/freezing operation is performed. As shown in FIG. 13, in the third air-heating/refrigerating operation, the first inverter compressor (2A) and second inverter compressor (2B) form the first system compression mechanism (2D), and the third inverter compressor (2C) forms the second system compression mechanism (2E). In this state, the first inverter compressor (2A), the second inverter compressor (2B) and the third inverter compressor (2C) are driven and, also, the booster compressor (53) is driven.

The third air-heating/refrigerating operation is performed when the air-heating ability is deficient in the first air-heating/refrigerating operation; that is, the vaporization heat amount is deficient. In this case, the four-way switch valves (3A, 3B, 3C), the expansion valves (42, 46, 52) and the like are set to be the same as the first air-heating/freezing operation described above, except that the outdoor expansion valve (26) is opened to a predetermined opening degree.

In this state, a part of the refrigerants discharged from the first inverter compressor (2A), second inverter compressor (2B) and third inverter compressor (2C) flows to the indoor heat exchanger (41) via the communication gas pipe (17), and the refrigerant condenses there. Then, the condensed refrigerant flows from the floor heater (37) into the receiver (14) through the branch pipe (36).

Thereafter, a part of the liquid refrigerant discharged from the receiver (14) flows through the first communication liquid pipe (11), and a part of the liquid refrigerant flowing through the first communication liquid pipe (11) flows into the refrigerating heat exchanger (45), and evaporates there. The other liquid refrigerant flowing through the first communication liquid pipe (11) flows into the freezing heat exchanger (51), and evaporates there. The gas refrigerant evaporated by the refrigerating heat exchanger (45) and the gas refrigerant discharged from the booster compressor (53) are merged through the low-pressure gas pipe (15), and the merged gas refrigerant returns to the first inverter compressor (2A) and second inverter compressor (2B).

The other part of the liquid refrigerant discharged from the receiver (14) is decompressed in the outdoor expansion valve (26) in the course of flowing through the liquid pipe (10), flows into the outdoor heat exchanger (4), and evaporates there. The evaporated gas refrigerant flows through the outdoor gas pipe (9), flows through the suction pipe (6c) via the first four-way switch valve (3A) and the second four-way switch valve (3B), and then returns to the third inverter compressor (2C). This cycle is repeatedly performed, thereby performing air-heating of the indoor spacing, i.e., the interior spacing of the store, performing floor-heating and, also, cooling the intra-storage spacings, i.e., the interior spacings of the refrigerating showcase and the freezing showcase.

In this manner, in the third air-heating/refrigerating operation, the cooling ability (vaporization heat amount) of the cold-storage unit (1C) and freezing unit (1D) are not balanced with the air-heating ability (condensation heat amount) of the indoor unit (1B), and deficient vaporization heat is obtained from the outdoor heat exchanger (4). In particular, the air-heating capacity is secured by driving the first inverter compressor (2A), the second inverter compressor (2B) and the third inverter compressor (2C).

Description is omitted herein regarding detailed contents of control, such as switch control of the first air-heating/refrigerating operation, second air-heating/freezing operation and the third air-heating/refrigerating operation, capacity control of the respective inverter compressors (2A, 2B, 2C) during the air-heating/refrigerating operations or control of opening degree of the expansion valve, and fan-airflow-rate control.

-Effects of First Embodiment-

As described above, according to First Embodiment, in the refrigerating apparatus using the three compressors (2A, 2B, 2C), by performing ON/OFF control of the third four-way switch valve (3C) to switch the communication state thereof in the air-cooling operation, it is possible to simply select between a state of using, for example, the first inverter compressor (2A) and second inverter compressor (2B) for cold-storage/freezing (45, 41) side and the third inverter compressor (2C) for air-conditioning (41) side from the application-side heat exchangers (41, 45, 51) of a plurality of systems (the first air-cooling/refrigerating operation) and a state of using the first inverter compressor (2A) for cold-storage/freezing (45, 51) side and the second inverter compressor (2B) and third inverter compressor (3C) for air-conditioning (41) side (the second air-cooling/refrigerating operation). Further, no inconvenience occurs in operation at the time of switching. After setting the first air-cooling/refrigerating operation and second air-cooling/refrigerating operation, by performing capacity-control and the like of the respective inverter compressors (2A, 2B, 2C), it is possible to necessary ability at the cold-storage/freezing (45, 51) side and the air-conditioning (41) side.

In addition, the number of the check valves (7) provided together with the third four-way switch valve (3C) on the suction sides of the compression mechanisms (2D, 2E) is limited to two. As such, in comparison to, for example, a case where four check valves (7) are provided, chattering noise generating in association with changes of the flow direction of refrigerant with respect to the check valves (7) can be suppressed. Further, reduction in ability due to a pressure loss in the suction side can be suppressed.

Further, since each of the compressors (2A, 2B, 2C) is an inverter compressor having a variable capacity, the respective compressors (2A, 2B, 2C) are able to be regulated in capacity and to be finely controlled for operation corresponding to freezing abilities required in the application-side heat exchangers (41, 45, 51) of each system such as cold-storage/freezing and air-conditioning.

(Second Embodiment)

Hereinafter, Second Embodiment of the present invention will be described. Second Embodiment is configured by partly modifying the refrigerant circuit (1E) of the refrigerating apparatus (1) according to First Embodiment.

Figure 14:
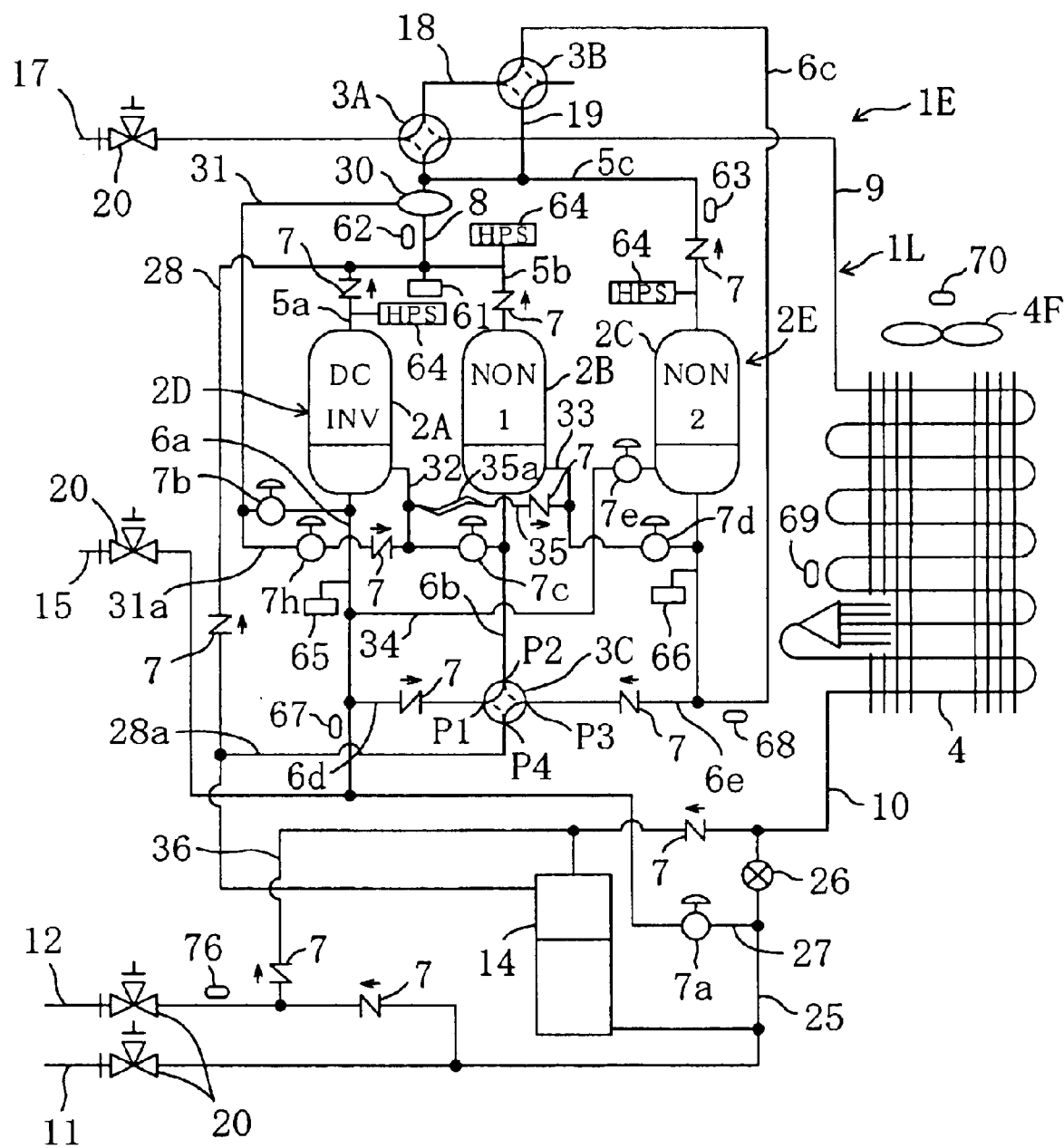
FIG. 14 is a partial view of a refrigerant circuit of a refrigerating apparatus according to Second Embodiment of the present invention.

In more specific, as shown in FIG. 14, compression mechanisms of the refrigerating apparatus are formed such that a first compressor (2A) is formed from a compressor having a variable capacity (inverter compressor), and a second compressor (2B) and a third compressor (2C) are each formed from a compressor having a fixed capacity.

An oil return pipe (31) is branched off between an oil separator (30) and a solenoid valve (7b), and a branch pipe (31a) is connected to a first oil-level equalizing pipe (32) between the first compressor (2A) and a solenoid valve (7c). The branch pipe (31a) is provided with a solenoid valve (7h) and a check valve (7). In addition, a capillary tube (35a) is provided in a communication pipe (35) connected to the first oil-level equalizing pipe (32) and a second oil-level equalizing pipe (33).

Although description is omitted herein regarding practical oil-return operation, open/close control of respective solenoid valves (7b, 7c, 7d, 7e, 7h) enables refrigerating machine oil separated from the refrigerant by the oil separator (30) to be selectively returned to the respective compressors (2A to 2C). In addition, excessive refrigerating machine oil stored in each of the respective compressors (2A to 2C) can be returned to the other compressor, thereby preventing deficiency/excessive refrigerating machine oil in the respective compressors (2A to 2C).

Other portions of the refrigerant circuit (1E) are formed to be the same as those in First Embodiment.

Even with the refrigerant circuit (1E) formed as described above, effects similar to those in First Embodiment can be exhibited. That is, in the refrigerating apparatus using the three compressors (2A, 2B, 2C), by performing ON/OFF control of the third four-way switch valve (3C) to switch the communication state thereof in the air-cooling operation, it is possible to simply select between a state of using, for example, the first inverter compressor (2A) and second inverter compressor (2B) for cold-storage/freezing (45, 41) side and the third inverter compressor (2C) for air-conditioning (41) side from the application-side heat exchangers (41, 45, 51) of a plurality of systems (the first air-cooling/refrigerating operation) and a state of using the first inverter compressor (2A) for refrigerating/refrigerating (45, 51) side and the second inverter compressor (2B) and third inverter compressor (3C) for air-conditioning (41) side (the second air-cooling/refrigerating operation). Further, no inconvenience occurs in operation at the time of switching.

In addition, as in First Embodiment, the number of the check valves (7) provided together with the third four-way switch valve (3C) on the suction sides of the compression mechanisms (2D, 2E) is limited to two. As such, in comparison to, for example, a case where four check valves (7) are provided, chattering noise generating in association with changes of the flow direction of refrigerant with respect to the check valves (7) can be suppressed. Further, reduction in ability due to a pressure loss in the suction side can be suppressed.

(Third Embodiment)

Figure 15:
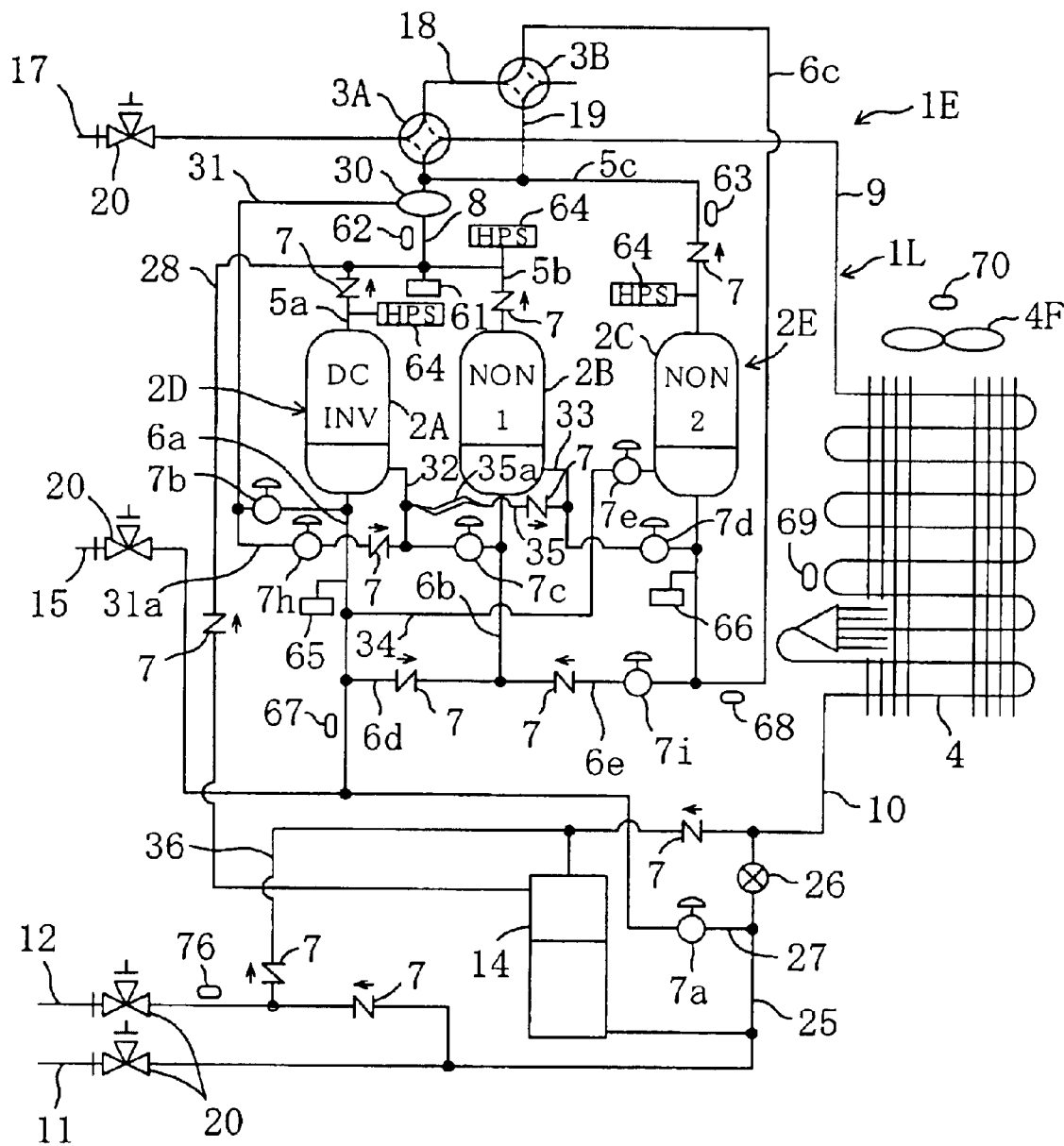
FIG. 15 is a partial view of a refrigerant circuit of a refrigerating apparatus according to Third Embodiment of the present invention.

Next, Third Embodiment of the present invention will be described. As shown in FIG. 15, Third Embodiment is formed such that, in Second Embodiment, the third four-way switch valve (3C) is not provided, and the use states of the second compressor (2B) are arranged to easily be switchable by combining check valves (7) and a solenoid valve (7i) (open/close valve).

In the refrigerant circuit (1E), as in the respective embodiments described above, the low-pressure gas pipe (15) of the cold-storage and freezing first system side circuit is connected to the suction pipe (6a) of the first compressor (2A), and the communication gas pipe (17) serving as the low-pressure gas pipe of the second system side circuit is connected to the suction pipe (6c) of the third compressor (2C). The branch pipe (6d) is connected to the suction pipe (6a) of the first compressor (2A), and the branch pipe (6e) is connected to the suction pipe (6c) of the third compressor (2C).

In addition, the branch pipe (6d) of the suction pipe (6a) of the first compressor (2A) is connected to the suction pipe (6b) of the second compressor (2B) via the check valve (7) permitting the flow of a refrigerant directed to the second compressor (2B). The branch pipe (6e) of the suction pipe (6c) of the third compressor (2C) is connected to the suction pipe (6b) of the second compressor (2B) via the check valve (7), for permitting the flow of the refrigerant directed to the second compressor (2B), and the open/close valve (7i).

In Third Embodiment, the operation in which the first compressor (2A) and second compressor (2B) are used for the cold-storage/freezing (45, 51) side and the third compressor (2C) is used for the air-conditioning (41) side can be implemented by setting the solenoid valve (7i) to a closed state. With the solenoid valve (7i) being set to an open state, since the refrigerant in the air-conditioning (41) side returns to the second compressor (2B), the operation in the state of using the second compressor (2B) for the air-conditioning (41) side can be implemented. In this case, also the refrigerant in the cold-storage/freezing (45, 51) side returns to the second compressor (2B) (the refrigerant in the air-conditioning (41) side is merged with the refrigerant in the cold-storage/freezing (45, 51) side, and the merged refrigerant returns thereto). For this reason, the control is somewhat complex. However, the switch operation itself for the use state of the second compressor (2B) can easily be implemented only through opening/closing operation of the solenoid valve (7i).

Also in the configuration described above, the number of the check valves (7) in the suction sides of the compression mechanisms (2D, 2E) is limited to two. As such, chattering noise can be suppressed and no inconvenience occurs at the time of switching the operation of the second compressor (2B). Further, since the number of the check valve (7) in the suction side is limited to two, reduction in ability due to a pressure loss can be suppressed.

(Fourth Embodiment)

Next, Fourth Embodiment of the present invention will be described. Fourth Embodiment is an example in which a four-way switch valve as a switch valve corresponding to the solenoid valve (7i) of Third Embodiment is used.

Figure 16:
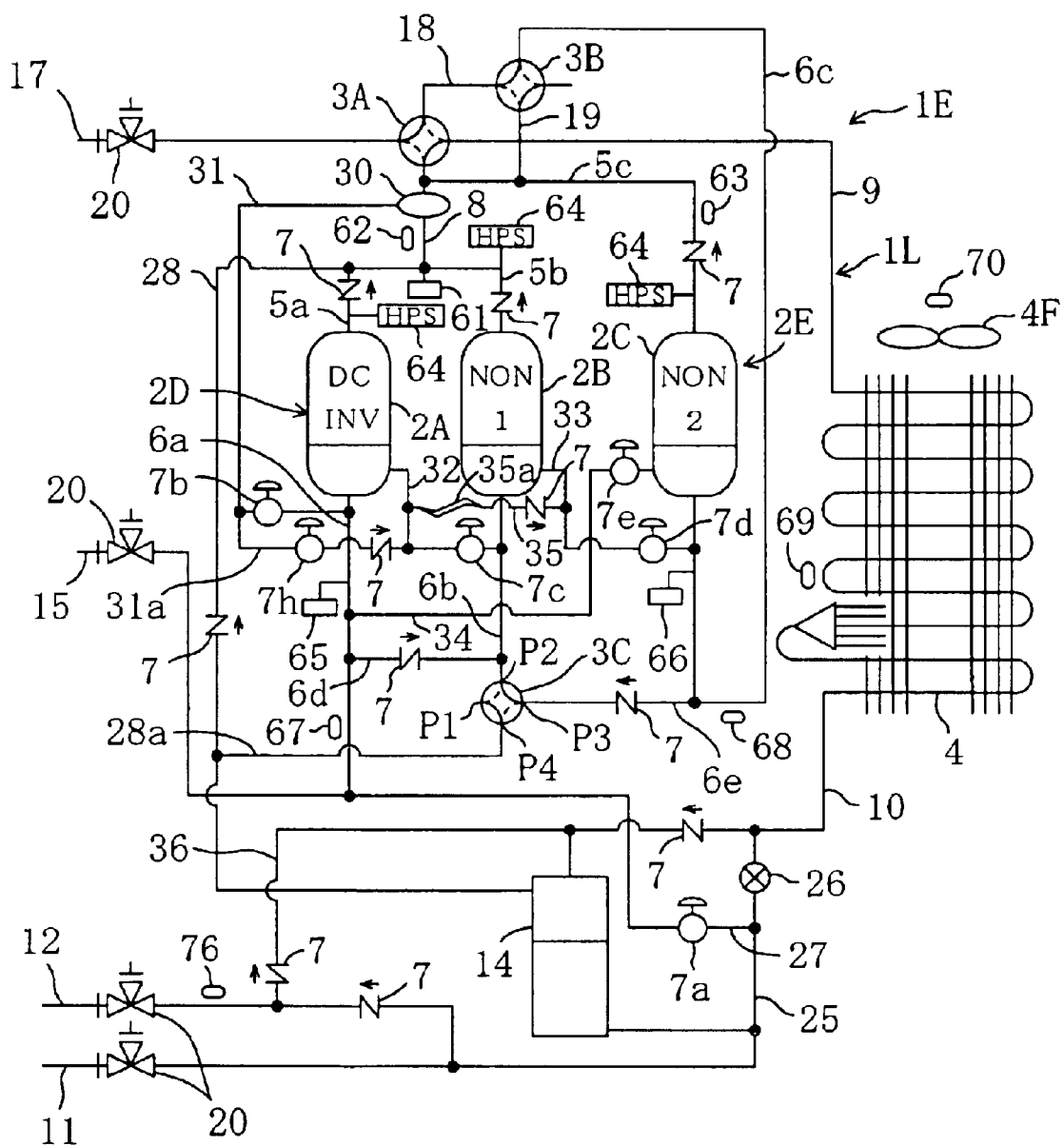
FIG. 16 is a partial view of a refrigerant circuit of a refrigerating apparatus according to Fourth Embodiment of the present invention.

As shown in FIG. 16, as in the respective embodiments described above, Fourth Embodiment is configured such that the low-pressure gas pipe (15) of the first system side circuit is connected to the suction pipe (6a) of the first compressor (2A), and the low-pressure gas pipe (17) of the second system side circuit is connected to the suction pipe (6c) of the third compressor (2C). The branch pipe (6d) is connected to the suction pipe (6a) of the first compressor (2A) and, also, the branch pipe (6e) is connected to the suction pipe (6c) of the third compressor (2C). In addition, the branch pipe (6d) of the suction pipe (6a) of the first compressor (2A) is connected to the suction pipe (6b) of the second compressor (2B) via the check valve (7) for permitting the flow of the refrigerant directed to the second compressor (2B). The configuration described above is similar to that of Third Embodiment.

The branch pipe (6e) of the suction pipe (6c) of the third compressor (2C) is connected to the suction pipe (6b) of the second compressor (2B) via the check valve (7), for permitting the flow of the refrigerant directed to the second compressor (2B), and the four-way switch valve (3C).

In the four-way switch valve (3C), the first port (P1) is closed, the suction pipe (6b) of the second compressor (2B) is connected to the second port (P2), and the branch pipe (6e) of the suction pipe (6c) of the third compressor (2C) is connected to the third port (P3). Further, the branch pipe (28a) of the gas vent pipe (28) from the receiver (14), which is the high-pressure side pipe of the refrigerant circuit (1E), is connected to the fourth port (P4). The four-way switch valve (3C) is configured to allow switching between the first state where the first port (P1) is communicated with the second port (P2) and the third port (P3) is communicated with the fourth port (P4) and the second state where the first port (P1) is communicated with the fourth port (P4) and the second port (P2) is communicated with the third port (P3) as similar to the above-described respective embodiments. The four-way switch valve (3C) may be a three-way switch valve.

When the four-way switch valve (3C) is set to the illustrated state (set to the ON state), the second compressor (2B) can be used for both the cold-storage/freezing (45, 51) side and the air-conditioning (41) side. When the four-way switch valve (3C) is set to the OFF state, the second compressor (2B) can be limited only for use in the cold-storage/freezing (45, 51) side. When performing switching over the four-way switch valve (3C), since the number of the check valves (7) is limited to two, chattering noise can be suppressed and no inconvenience occurs, as in Third Embodiment.

In Fourth Embodiment, the four-way switch valve (3C) is used in place of the solenoid valve (7i) used in Third Embodiment. The refrigerant transmission resistance is lower in the four-way switch valve (3C) than in the solenoid valve (7i). This offers an advantage in that the COP reduction due to the pressure loss in the suction side can be reduced, compared to the configuration of Third Embodiment.

(Fifth Embodiment)

Next, Fifth Embodiment of the present invention will be described. Fifth Embodiment is an example in which the four-way switch valve (3C), the check valves (7) and the solenoid valve (7j) are combined and provided on the suction sides of the three compressors (2A, 2B, 2C).

Figure 17:
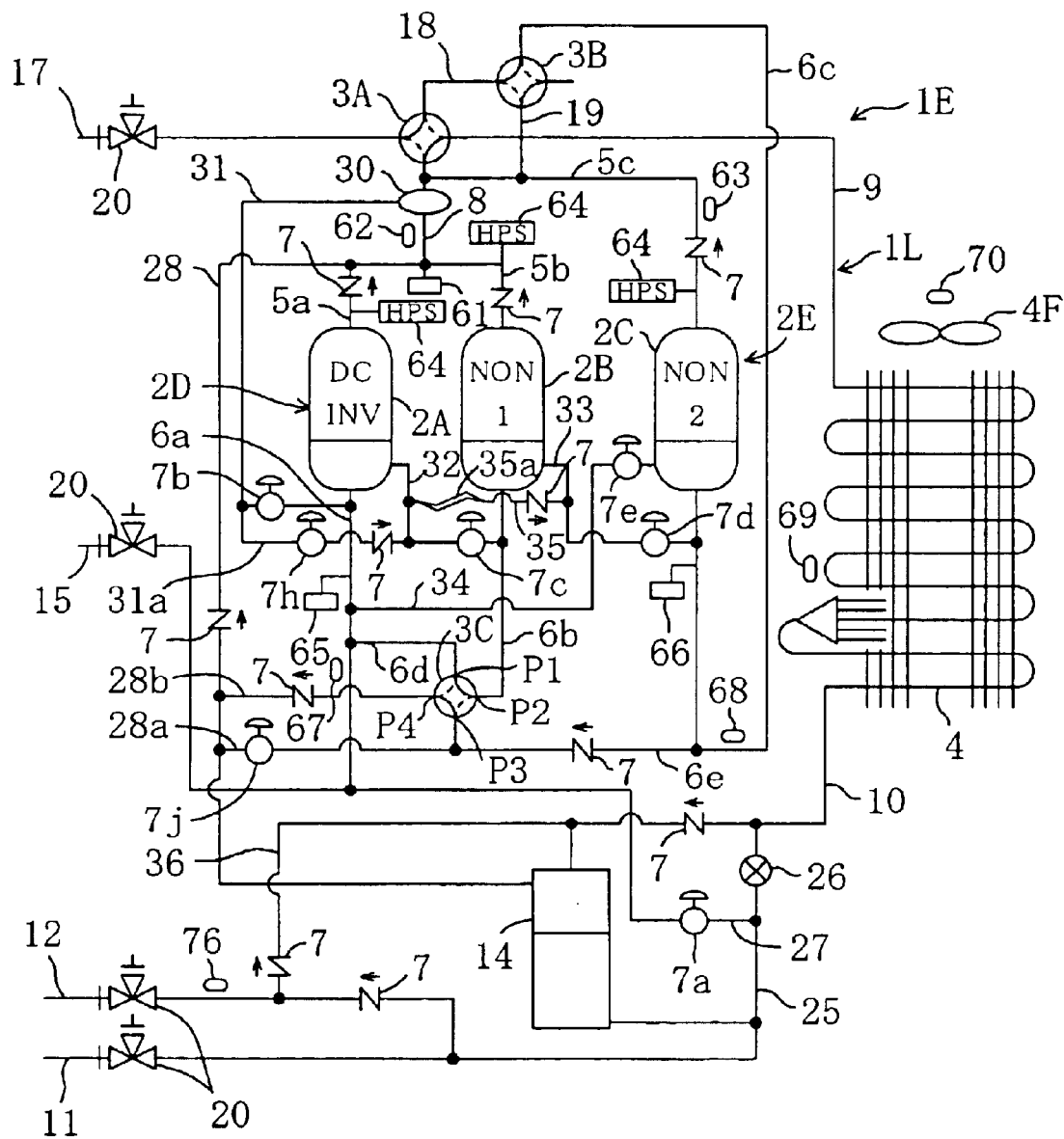
FIG. 17 is a partial view of a refrigerant circuit of a refrigerating apparatus according to Fifth Embodiment of the present invention.

Referring to FIG. 17, the four-way switch valve (3C) is configured to allow switching between the first state where the first port (P1) is communicated with the second port (P2) and a third port (P3) is communicated with a fourth port (P4) and the second state where the first port (P1) is communicated with the fourth port (P4) and the second port (P2) is communicated with the third port (P3).

The low-pressure gas pipe (15) of the first system side circuit is connected to the suction pipe (6a) of the first compressor (2A), and the low-pressure gas pipe (17) of the second system side circuit is connected to the suction pipe (6c) of the third compressor (2C). The branch pipe (6d) is connected to the suction pipe (6a) of the first compressor (2A), and the branch pipe (6e) is connected to the suction pipe (6c) of the third compressor (2C). In each of First, Second and Fourth Embodiments, the check valve is provided in the branch pipe (6d) of the suction pipe (6a) of the first compressor (2A). In the present example, however, the check valve is not provided in the branch pipe (6d).

The branch pipe (6d) of the suction pipe (6a) of the first compressor (2A) is connected to the first port (P1) of the four-way switch valve (3C), and the suction pipe (6b) of the second compressor (2B) is connected to the second port (P2). In addition, the branch pipe (6e) of the suction pipe (6c) of the third compressor (2C) and the branch pipe (28a) of the gas bent pipe (28) from the receiver (14) as the high-pressure side pipe of the refrigerant circuit (1E) are merged with each other and connected to the third port (P3). The branch pipe (6e) is provided with the check valve (7) for permitting the flow of the refrigerant directed to the third port (P3), and the branch pipe (28a) is provided with the solenoid valve (7j) (open/close valve).

Further, the fourth port (P4) is connected to the branch pipe (28b) of the gas vent pipe (28) from the receiver (14) as the high-pressure side pipe of the refrigerant circuit (1E), and the high-pressure side tube (28b) is provided with the check valve (7) for checking the flow of the refrigerant directed to the fourth port (P4).

In Fifth Embodiment, the solenoid valve (7j) is opened when switching is performed over the four-way switch valve (3C), whereas it is kept closed in other instances.

When the four-way switch valve (3C) is set to the illustrated state, the first compressor (2A) and second compressor (2B) form the first system compression mechanism (2D), and the third compressor (2C) forms the second system compression mechanism (2E). That is, the refrigerant in the cold-storage/freezing (45, 51) side is compressed upon return to the first compressor (2A) and the second compressor (2B), discharged from the two compressors (2A, 2B), and led to flow into the outdoor heat exchanger (4). On the other hand, the refrigerant in the air-conditioning (41) side is compressed upon return to the third compressor (2C), merged with the refrigerant in the first system side, and led to flow into the outdoor heat exchanger (4).

When switching the use state of the second compressor (2B), the four-way switch valve (3C) is turned ON after the solenoid valve (7j) is opened and, then, the solenoid valve (7j) is momentarily operated to be closed. According to the operation, the refrigerant in the cold-storage/freezing (45, 51) side is compressed upon return to into the first compressor (2A), discharged from the first compressor (2A), and led to flow into the outdoor heat exchanger (4). On the other hand, the refrigerant in the air-conditioning (41) side is compressed upon return into the second compressor (2B) and the third compressor (2C), merged with the refrigerant in the first system side, and led to flow into the outdoor heat exchanger (4).

In Fifth Embodiment, since the check valve is not provided in the branch pipe (6d) of the suction pipe (6a) of the first compressor (2A), the suction side of the compression mechanism (2D, 2E) has one check valve (7). As such, chattering noise can be even more suppressed than in the respective embodiments. Furthermore, since the pressure loss in the suction side of the second compressor (2B) is even more reduced, the reduction in ability can be even more suppressed.

(Other Embodiments)

In the present invention, the respective embodiments described above may be configured as described below.

For example, in First Embodiment, while all the compressors (2A, 2B, 2C) are each formed of the inverter-controlled compressor having a variable capacity. Depending on the case, however, a compressor having a variable capacity and a compressors having a fixed capacity may be used in combination. In addition, in Second to Fifth Embodiments, the compressor having a variable capacity and the compressors having a fixed capacity are used in combination. However, the combinations of the compressors may be appropriately changed as in a case where, for example, the compressor having a variable capacity is used for all the three compressors.

INDUSTRIAL APPLICABILITY

As described above, the present invention is useful for refrigerating apparatuses.

What is claimed is:

1. A refrigerating apparatus wherein compression mechanisms of a refrigerant circuit having application-side heat exchangers of a plurality of systems are formed by combining three compressors, a four-way switch valve is connected to the suction sides of the compression mechanisms, and the four-way switch valve can switch between a first state where a first port is communicated with a second port and a third port is communicated with a fourth port and a second state where the first port is communicated with the fourth port and the second port is communicated with the third port, comprising:
    a branch pipe of a suction pipe of a first compressor is connected to the first port through a check valve for permitting a flow of a refrigerant directed to the first port;
    a suction pipe of a second compressor is connected to the second port;
    a branch pipe of a suction pipe of a third compressor is connected to the third port through the check valve for permitting the flow of a refrigerant directed to the third port; and
    a high-pressure side pipe of the refrigerant circuit is connected to the fourth port.

2. The refrigerating apparatus according to claim 1, wherein the application-side heat exchangers of the plurality of systems include application-side heat exchangers for cold-storage/freezing and an application-side heat exchanger for air-conditioning.

3. The refrigerating apparatus according to claim 1 or 2, wherein each of the compressors forming the compression mechanism is formed from a compressor having a variable capacity.

4. The refrigerating apparatus wherein compression mechanisms of a refrigerant circuit having application-side heat exchangers of a plurality of systems are formed by combining three compressors comprising:
    a branch pipe of a suction pipe of a first compressor is connected to a suction pipe of a second compressor through a check valve for permitting a flow of a refrigerant directed to the second compressor; and
    a branch pipe of a suction pipe of a third compressor is connected to a suction pipe of the second compressor through the check valve for permitting the flow of a refrigerant directed to the second compressor and an open/close valve for opening/closing the branch pipe of the suction pipe of the third compressor.

5. The refrigerating apparatus wherein compression mechanisms of a refrigerant circuit having application-side heat exchangers of a plurality of systems are formed by combining three compressors comprising:
    a branch pipe of a suction pipe of the first compressor is connected to a suction pipe of a second compressor through a check valve for permitting a flow of a refrigerant directed to the second compressor;
    a branch pipe of a suction pipe of a third compressor is connected to the suction pipe of the second compressor through the check valve, for permitting the flow of a refrigerant directed to the second compressor, and a four-way switch valve; and
    in the four-way switch valve, a first port is closed, the suction pipe of the second compressor is connected to a second port, the branch pipe of the suction pipe of the third compressor is connected to a third port, and a high-pressure side pipe of the refrigerant circuit is connected to a fourth port, and the four-way switch valve can change between a first state where the first port is communicated with the second port and the third port is communicated with the fourth port and a second state where the first port is communicated with the fourth port and the second port is communicated with the third port.

6. The refrigerating apparatus wherein compression mechanisms of a refrigerant circuit having application-side heat exchangers of a plurality of systems are formed by combining three compressors, a four-way switch valve is connected to suction sides of the compression mechanisms, and the four-way switch valve can switch between a first state where a first port is communicated with a second port and a third port is communicated with a fourth port and a second state where the first port is communicated with the fourth port and the second port is communicated with the third, comprising:
    a branch pipe of a suction pipe of the first compressor is connected to the first port;
    a suction pipe of a second compressor is connected to the second port
    a branch pipe of a suction pipe of a third compressor and a high-pressure side pipe of the refrigerant circuit are merged and connected to the third port, a check valve for checking the flow of a refrigerant directed to the third port is connected to the branch pipe, and an open/close valve is connected to the high-pressure side pipe; and
    a high-pressure side pipe of the refrigerant circuit is connected to the fourth port, and the high-pressure side pipe is provided with the check valve for checking the flow of a refrigerant directed to the fourth port.

7. The refrigerating apparatus according to any of claims 4 to 6, wherein the application-side heat exchangers of the plurality of systems include application-side heat exchangers for cold-storage/freezing and an application-side heat exchanger for air-conditioning.

8. The refrigerating apparatus according to claim 1, 4, 5 or 6 wherein:
    the refrigerant circuit includes a first system side circuit for cold-storage/freezing and a second side circuit for air-conditioning;
    a low-pressure gas pipe of the first system side is connected to the suction pipe of the first compressor; and
    a low-pressure gas pipe of the second system side is connected to the suction pipe of the third compressor.

* * * * *